US011086248B2

(12) United States Patent
Ohta et al.

(10) Patent No.: US 11,086,248 B2
(45) Date of Patent: Aug. 10, 2021

(54) IMAGE FORMING APPARATUS WITH FAN CONFIGURED FOR DUST-RESISTANT COOLING OF OPTICAL SCANNING UNIT

(71) Applicant: CANON KABUSHIKI KAISHA, Tokyo (JP)

(72) Inventors: Mitsuhiro Ohta, Yokohama (JP); Yoshihiko Tanaka, Mishima (JP); Hisanori Kobayashi, Kawasaki (JP); Takatoshi Tanaka, Atami (JP); Naoki Matsushita, Suntou-gun (JP); Hiroki Katayama, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/939,615

(22) Filed: Jul. 27, 2020

(65) Prior Publication Data

US 2021/0041801 A1 Feb. 11, 2021

(30) Foreign Application Priority Data

Aug. 9, 2019 (JP) .............................. JP2019-147179

(51) Int. Cl.
*G03G 15/04* (2006.01)
*H04N 1/028* (2006.01)

(52) U.S. Cl.
CPC ... *G03G 15/04072* (2013.01); *G03G 15/0409* (2013.01); *H04N 1/0283* (2013.01); *G03G 2215/0404* (2013.01)

(58) Field of Classification Search
USPC ............................................................ 399/4
See application file for complete search history.

(56) References Cited

U.S. PATENT DOCUMENTS

| | | | |
|---|---|---|---|
| 6,437,817 B1 | 8/2002 | Ohta et al. ..................... | 347/254 |
| 6,856,338 B2 | 2/2005 | Takahashi et al. ........... | 347/225 |
| 6,928,100 B2 | 8/2005 | Sato et al. ..................... | 372/109 |
| 6,969,846 B2 | 11/2005 | Tanaka et al. ................ | 250/239 |
| 7,508,859 B2 | 3/2009 | Azami et al. ................. | 372/101 |
| 9,128,291 B2 | 9/2015 | Nagatoshi et al. .. | G03G 15/043 |
| 9,411,157 B2 | 8/2016 | Ohta et al. ....... | G03G 15/04072 |
| 9,523,851 B2 | 12/2016 | Nakamura et al. .. | G02B 26/121 |
| 9,581,929 B2 | 2/2017 | Nagatoshi et al. .. | G03G 15/043 |
| 9,854,120 B2 | 12/2017 | Tanaka et al. ......... | H04N 1/113 |

(Continued)

FOREIGN PATENT DOCUMENTS

JP 02115870 A * 4/1990
JP 07261638 A * 10/1995

(Continued)

*Primary Examiner* — Q Grainger
(74) *Attorney, Agent, or Firm* — Venable LLP

(57) ABSTRACT

An image forming apparatus for forming an image on a recording material includes a photosensitive member; an optical scanning unit including a light source, an optical box, and a cover; and a fan. The fan is provided so that air from the fan directly impinges on the cover of the optical scanning unit. As seen in a direction perpendicular to a rotational axis of the rotatable polygonal mirror, a rib extending from a top plate of the cover toward an optical box side is provided at a portion of the cover in the neighborhood of a light beam emitting port of the optical scanning unit. The cover is provided with an extended portion extended from the rib in a light beam emitting direction.

16 Claims, 17 Drawing Sheets

(56) References Cited

U.S. PATENT DOCUMENTS

| | | | |
|---|---|---|---|
| 9,857,721 B2 | 1/2018 | Yamaya et al. | G03G 15/04036 |
| 9,864,934 B2 | 1/2018 | Kobayashi et al. | H04N 1/0461 |
| 9,977,237 B2 | 5/2018 | Ohta et al. | H04N 1/00559 |
| 10,185,242 B2 | 1/2019 | Nagatoshi | G03G 15/04072 |
| 10,551,764 B2 | 2/2020 | Tanaka | G02B 26/10 |
| 2018/0259876 A1 | 9/2018 | Nagatoshi | G03G 15/04072 |
| 2020/0122483 A1 | 4/2020 | Tanaka et al. | G02B 26/127 |
| 2020/0310276 A1 | 10/2020 | Katayama et al. | G03G 15/04036 |

FOREIGN PATENT DOCUMENTS

| | | |
|---|---|---|
| JP | H11-133336 | 5/1999 |
| JP | 2000-321517 | 11/2000 |
| JP | 2012-128068 | 7/2012 |
| JP | 2017-076000 | 4/2017 |
| JP | 2018-151617 | 9/2018 |

* cited by examiner

IMAGE FORMING APPARATUS WITH FAN CONFIGURED FOR DUST-RESISTANT COOLING OF OPTICAL SCANNING UNIT

FIELD OF THE INVENTION AND RELATED ART

The present invention relates to an image forming apparatus, such as a copying machine or a printer, including an optical scanning apparatus.

Conventionally, the optical scanning apparatus used in the image forming apparatus such as the copying machine or the printer optically modulates laser light emitted form a lower surface depending on an image signal and causes a polygonal mirror mounted on a scanner motor to deflect the modulated laser light, so that a surface of a photosensitive drum is scanned with the laser light. The laser light is imaged on the surface of the photosensitive drum through a scanning lens, so that an electrostatic latent image is formed.

With speed-up and downsizing of the image forming apparatus is recent years, there is a tendency that an amount of heat generation from an IC of a driving substrate of the polygonal mirror and from a fixing device increases. On the other hand, an inside space of the image forming apparatus becomes narrow and a temperature in the space is further liable to increase. Therefore, in order to prevent deformation of an optical box of the optical scanning apparatus and optical component parts supported inside the optical box due to heat, there is also an image forming apparatus in which a fan for cooling the optical scanning apparatus by blowing the air on the optical scanning apparatus.

In Japanese Laid-Open Patent Application (JP-A) 2018-151617, a scanning lens is provided in the neighborhood of an emitting port which is provided in a side surface of the optical box and through which the laser light passes. When the air containing dust is blown from the fan onto the optical scanning apparatus, there is a possibility that the air containing the dust enters an inside of the optical scanning apparatus through the emitting port provided in the side surface of the optical box and then the dust is deposited on the optical component parts provided inside the optical scanning apparatus. In JP-A Hei 11-133336, an elastic dustproof member is provided in a hole bored in the optical scanning apparatus, so that a dustproof performance of the optical scanning apparatus is improved. Further, in JP-A 2012-128068, a heater for heating a wall surface is provided on a casing bottom side smaller than a peripheral portion in thermal deformation amount due to temperature rise in the inside of a casing of the optical scanning apparatus, so that distortion and twist of the casing due to thermal deformation are corrected.

In JP-A 2012-128068, there is a liability that the temperature in the optical scanning apparatus further increases due to heat of the heater for correcting the distortion and the twist of the casing by the thermal deformation. Here, for a constitution in which the scanning lens is provided in the neighborhood of the emitting port as disclosed in JP-A 2018-151617, the case where the dust proof performance of the optical scanning apparatus is improved by providing the elastic dustproof member in the hole bored in the optical scanning apparatus as disclosed in JP-A Hei 11-133336 will be considered. In such a constitution, in order to cool the optical scanning apparatus, the air containing the dust is directly blown by the fan onto the scanning lens provided in the neighborhood of the emitting port, so that the dust is deposited on the scanning lens in some cases. When the dust is deposited on the scanning lens, there was a problem such that a transmittance or a reflectance of an optical surface of the scanning lens decreases and correspondingly, an image becomes thin in density locally or as a whole.

SUMMARY OF THE INVENTION

The present invention has solved the above-described problem, and a principal object thereof is to provide an image forming apparatus including an optical scanning apparatus improved in dust proof performance.

According to an aspect of the present invention, there is provided an image forming apparatus for forming an image on a recording material, comprising: a photosensitive member; an optical scanning unit configured to scan the photosensitive member with a light beam in accordance with image information, wherein the optical scanning unit includes a light source configured to emit the light beam in accordance with the image information, a rotatable polygonal mirror configured to deflect the light beam emitted from the light source, an optical box supporting the rotatable polygonal mirror, and a cover covering an opening of the optical box; and a fan configured to cool an inside of the image forming apparatus, wherein the fan is provided so that air from the fan directly impinges on the cover of the optical scanning unit, wherein as seen in a direction perpendicular to a rotational axis of the rotatable polygonal mirror, a rib extending from a top plate of the cover toward an optical box side is provided at a portion of the cover in a neighborhood of a light beam emitting port of the optical scanning unit, and wherein the cover is provided with an extended portion extended from the rib in a light beam emitting direction.

Further features of the present invention will become apparent from the following description of exemplary embodiments with reference to the attached drawings.

DESCRIPTION OF EMBODIMENTS

Embodiments of an image forming apparatus including an optical scanning apparatus according to the present invention will be specifically described using FIGS. 1 to 7 and 13.

First Embodiment

First, with reference to FIGS. 1 to 7 and 13, a structure of an image forming apparatus 110 including an optical scanning apparatus according to a first embodiment of the present invention will be described.

<Image Forming Apparatus>

Figure 1:
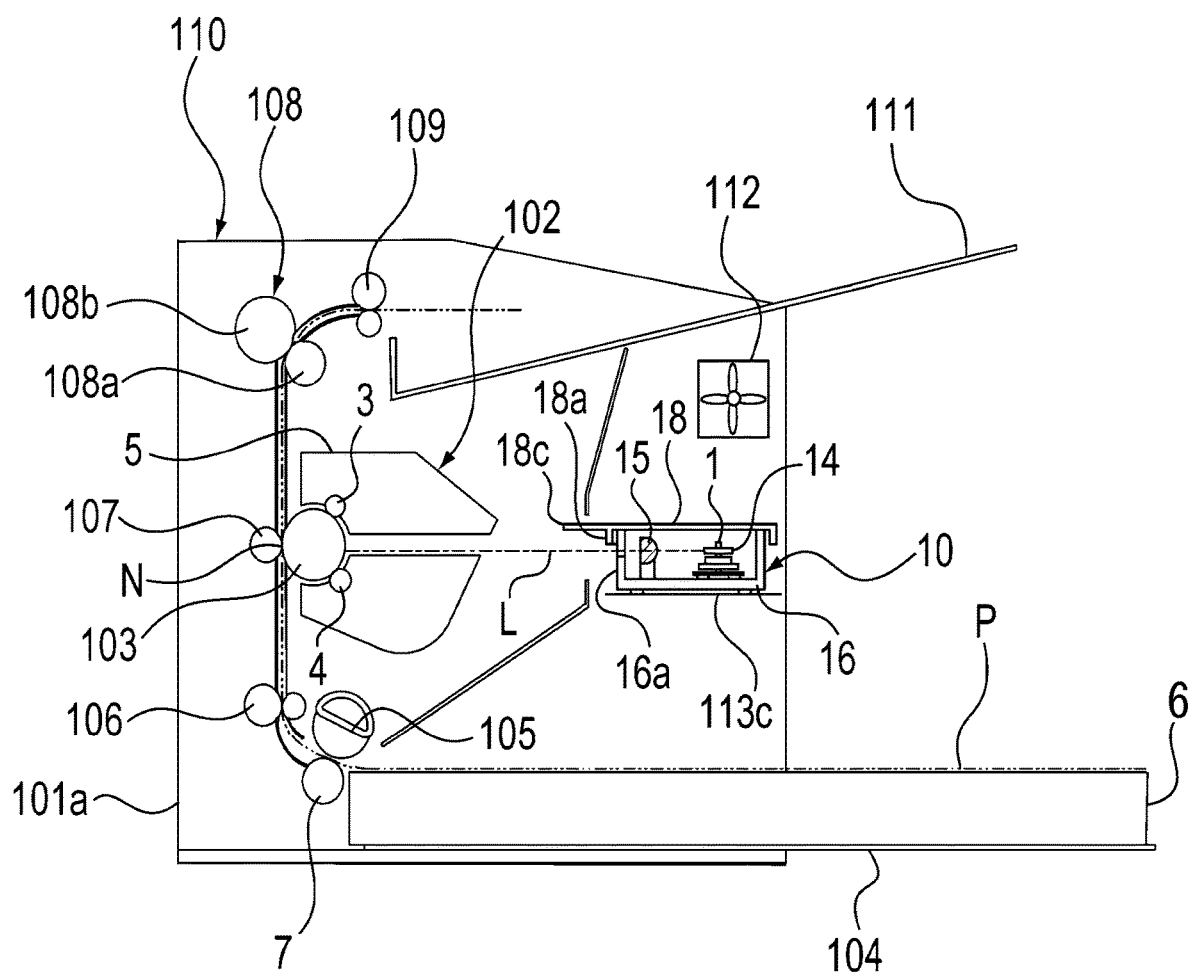
FIG. 1 is a sectional view showing a structure of an image forming apparatus.

The structure of the image forming apparatus 110 will be described using FIG. 1. FIG. 1 is a sectional view showing the structure of the image forming apparatus 110. The image forming apparatus 110 shown in FIG. 1 is an example of a laser beam printer for forming an image on a recording material such as paper (sheet). In the image forming apparatus 110 shown in FIG. 1, a process cartridge 102 mounted in an apparatus main assembly 110a so as to be mountable in and dismountable from the apparatus main assembly 110a is provided. The process cartridge 102 includes a photosensitive drum 103, a charging roller 3, a developing device 4, a cleaner 5 and the like.

The photosensitive drum 103 as an image bearing member rotates in the clockwise direction of FIG. 1. A surface of the photosensitive drum 103 is electrically charged uniformly by the charging roller 3. The uniformly charged surface of the photosensitive drum 103 is irradiated with laser light L (light beam), based on image information, from an optical scanning apparatus as an exposure means. By this, an electrostatic latent image is formed on the surface of the photosensitive drum 103. To the electrostatic latent image formed on the surface of the photosensitive drum 103, a developer is supplied from the developing device 4 as a developing means, so that the electrostatic latent image is visualized as a toner image.

On the other hand, at a lower portion of the image forming apparatus 110, a feeding cassette 6 for accommodating recording materials P such as paper is provided. The recording material P stacked on a stacking plate 104 provided inside the feeding cassette 6 are fed by a feeding roller 105 while being separated one by one by a separation roller 106. Thereafter, the recording material P is fed to a transfer nip N, formed by the photosensitive drum 103 and a transfer roller 107, with predetermined timing by a registration roller pair 106.

Onto the recording material P fed to the transfer nip N, the toner image formed on the surface of the photosensitive drum 103 is transferred by the transfer roller 107. Residual toner remaining on the surface of the photosensitive drum 103 after the transfer is removed by the cleaner 5 as a cleaning means.

The recording material P on which an unfixed toner image is carried in the transfer nip N is further fed to a downstream side and then is heated and pressed by a fixing device 108 including a heating roller 108a incorporating a heating member and a pressing roller 108b. Thereafter, the recording material P is discharged by a discharging roller pair 109 onto a discharge tray 111 provided outside the image forming apparatus 110.

After feeding of the recording material P on the stacking plate 104 by the feeding roller 105 is started, a fan 112 provided inside the image forming apparatus 110 is driven in times before and after a time until the recording material P is discharged on the discharge tray 111. By the fan 112, the air in the outside of the apparatus main assembly 110a is sent to an inside of the apparatus main assembly 110a, so that temperature rise in the inside of the image forming apparatus 110 is suppressed.

Incidentally, in this embodiment, a constitution in which the charging roller 3 and the developing device 4 which are used as process means actable on the photosensitive drum 103 are provided integrally with the photosensitive drum 103 in the process cartridge 102 was employed, but a constitution in which each of the process means are prepared as separate members from the photosensitive drum 103 may also be employed.

<Optical Scanning Apparatus>

Figure 2:
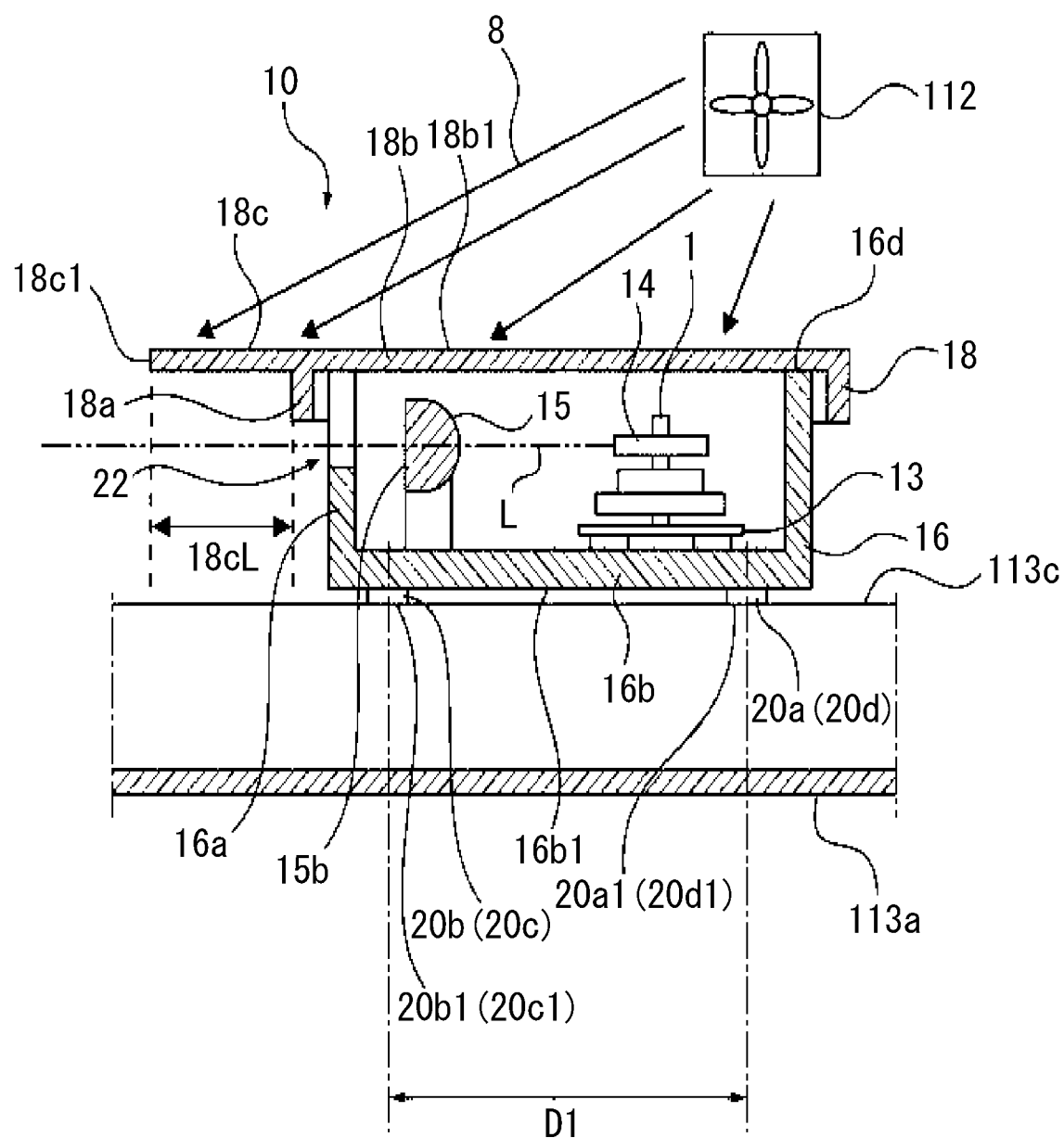
FIG. 2 is a sectional view showing an optical scanning apparatus in a first embodiment and a flow of the air by a fan.
Figure 13:
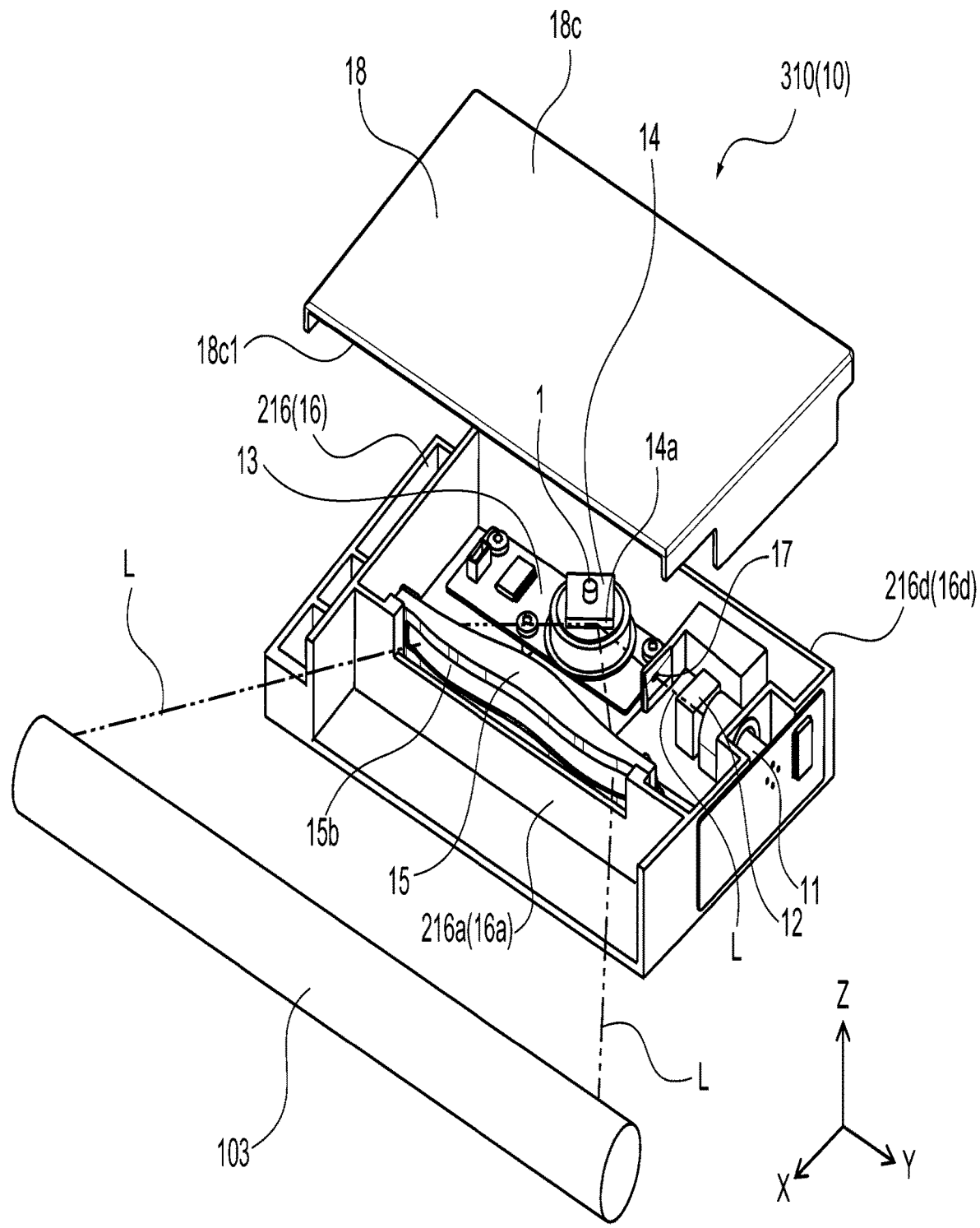
FIG. 13 is a perspective view showing a structure of an optical scanning apparatus in a third embodiment.

Next, a structure of the optical scanning apparatus 10 in this embodiment will be described with reference to FIGS. 2 and 13. FIG. 2 is a sectional view showing the optical scanning apparatus 10 in this embodiment and a flow of air (wind) 8 by the fan 112. FIG. 13 is a perspective view showing a structure of an optical scanning apparatus 310 in a third embodiment described later, but an inside structure of the optical scanning apparatus 10 is also similar to the inside structure of the optical scanning apparatus 310 in the third embodiment, and therefore reference numerals or symbols of portions (members) for the optical scanning apparatus 10 in this embodiment are also shown in parentheses in FIG. 13.

The optical scanning apparatus 10 shown in FIG. 13 is fixedly provided to an optical table 113 (FIG. 8) which is a part of a frame of the image forming apparatus 110. In the optical scanning apparatus 10 shown in FIG. 13, the laser light L emitted from a light source 11 is condensed in a sub-scan direction by a cylindrical lens 12 and is limited to a predetermined beam diameter by an optical diaphragm 17 formed in the optical box 16.

Thereafter, the laser light L is deflected by a polygonal mirror 14 as a rotatable polygonal mirror rotationally driven about a rotation shaft 1 around Z-axis by a scanner motor 13. Thereafter, the laser light L passes through a toric lens 15 which is a scanning lens and is condensed at the surface of the photosensitive drum 103, and the photosensitive drum surface is scanned with the laser light L in a Y-axis direction, so that the electrostatic latent image is formed on the photosensitive drum 103. The laser light L reflected by a reflecting surface 14a of the polygonal mirror 14 is emitted in a direction perpendicular to the rotation shaft 1.

The toric lens 15 is one of optical component parts for guiding the laser light L, deflected by the polygonal mirror 14, to the photosensitive drum 103. The toric lens 15 has a lens characteristic (fθ characteristic) such that when the laser light L enters with an angle θ, an image with a size (f×θ) obtained by multiplying the angle θ by a focal length f of the toric lens 15 is formed. Of the plurality of optical component parts supported inside the optical scanning apparatus 10, the toric lens 15 is constituted as the optical component part disposed at a position closest to the photosensitive drum 103 (image bearing member) in a passing path of the laser light L.

The optical component parts such as the light source 11, the cylindrical lens 12, the scanner motor 13, and the toric lens 15 are accommodated inside the optical box 16 and are supported by the optical box 16. An upper opening 16d of the optical box 16 is covered by a cover 18 made of resin or metal.

As shown in FIG. 2, an optical box rib 16a projecting from a bottom plate 16b of the optical box 16 toward the laser light L is provided. On the other hand, a cover rib 18a projecting from a top plate 18a of the cover 18 toward the laser light L is provided. The cover rib 18a and the optical box rib 16a are provided at positions deviated from each other with respect to an emitting direction of the laser light L.

On a side (optical surface 15b side) downstream of the toric lens with respect to the emitting direction of the laser light L, an emitting port (opening) 22 is formed between the optical box 16 and the cover 18. The emitting port 22 is formed between the cover rib 17a and the optical box rib 16a. As a part of the cover 18, an extended portion 18c extended toward a side downstream of the emitting port 22 with respect to the emitting direction is provided. The extended portion 18c is a portion extending from the cover rib 18a in the emitting direction of the laser light L, and a length 18L thereof may preferably be 5-20 mm. In this embodiment, the length 18cL is 8 mm. With respect to the emitting direction of the laser light L, at a position opposite from the emitting port 22, the fan 112 is provided outside and above the cover 18. The air 8 sent (blown) by the fan 112 is blown toward a top surface 18b1 of the cover 18 in a downstream direction of the emitting direction of the laser light L.

<Flow of Air>

Next, with reference to FIG. 2, the optical scanning apparatus 10 in this embodiment and a flow of the air 8 by the fan 112 will be described. As shown in FIG. 2, on the optical surface 15b side of the toric lens 15 where the laser light L is emitted through the toric lens 15, the optical box rib 16a and the cover rib 18a extending toward the laser light L from the bottom plate 16b of the optical box 16 and the top plate 18b of the cover 18, respectively are provided.

The cover 18 includes the extended portion 18c extending along the top surface 18b1 of the top plate 18b. Above the optical scanning apparatus 10, the fan 112 is provided. The air 8 flows from the fan 112 toward the top surface 18b1 of the optical scanning apparatus 10 and impinges on the top surface 18b1 of the cover 18 including the extended portion 18c.

In the optical scanning apparatus 10 in this embodiment shown in FIG. 2, a free end portion 18c1 of the extended portion 18c is in a position sufficiently remote from the optical surface 15b of the toric lens 15 in the downstream direction of the emitting direction of the laser light L. For that reason, of the air flowing from the fan 112 toward the cover 18, a component of the air flowing toward the emitting port 22 is blocked by the extended portion 18c. By this, an amount of the air which passes through the emitting port 22 and which flows into the optical box 16 toward the toric lens 15 can be reduced.

Further, the amount of the air flowing into the optical box 16 through the emitting port 22 is reduced by the extended portion 18c, and therefore, the amount of the air flowing further into the optical box 16 toward a rear side than the toric lens 15 can be reduced. By this, it becomes possible to reduce an amount of dust deposited on the toric lens 15 provided in the neighborhood of the emitting port 22 and another optical component parts such as the polygonal mirror 14 provided at a position remote from the emitting port 22 inside the optical box 16 of the optical scanning apparatus 10. As a result, it becomes possible to reduce a degree of an image defect such as a lowering in density occurring due to deposition of the dust on the optical component parts.

Figure 3:
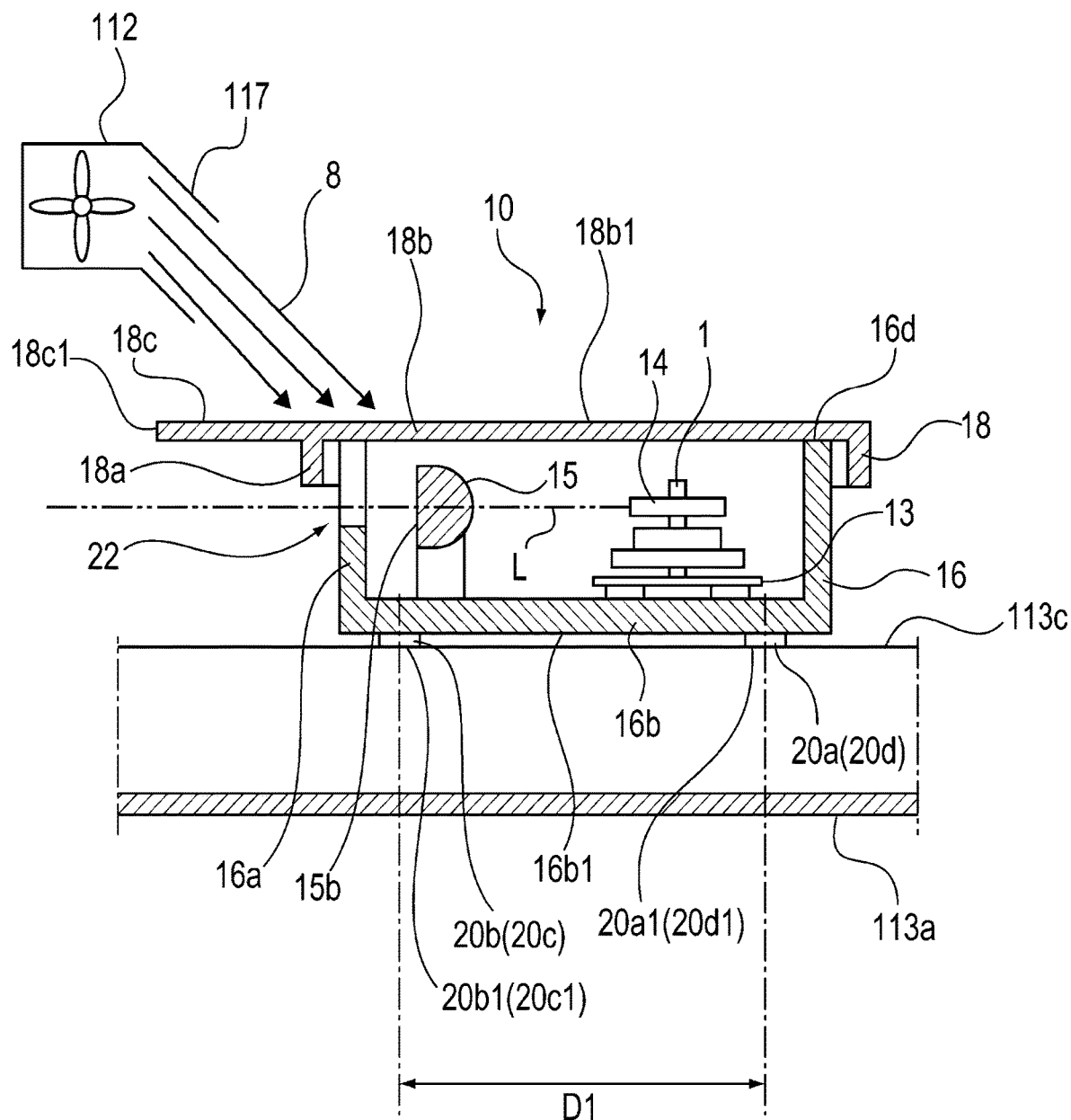
FIG. 3 is a sectional view showing the optical scanning apparatus in the first embodiment and a flow of the air by a fan provided at another position.

Next, with reference to FIG. 3, the optical scanning apparatus 10 in this embodiment and a flow of the air 8 by the fan 112 provided at another position will be described. FIG. 3 is a sectional view showing the optical scanning apparatus 10 in this embodiment and the flow of the air 8 by the fan 112 provided at another position. In the optical scanning apparatus 10 shown in FIG. 2, an example of the case where the fan 112 is provided on a side upstream of the extended portion 18c with respect to the emitting direction of the laser light L was described. In the optical scanning apparatus 10 shown in FIG. 3, an example of the case where the fan 112 is provided on a side downstream of the extended portion 18c with respect to the emitting direction of the laser light L is shown. In this case, the fan 112 is provided with a duct 117 extending from an air blowing port (opening) thereof.

Even in the optical scanning apparatus 10 shown in FIG. 3, the flow of the air 8 from the fan 112 toward the emitting port 22 is blocked by the extended portion 18c. Thus, when a constitution of an air path along which the air 8 from the fan 112 does not directly flows (blows) toward the emitting port 22 is employed, it is possible to obtain an effect similar to the above-described effect since the air 8 from the fan 112 is blocked by the extended portion 18c. By this, a dust proof performance of the optical scanning apparatus 10 can be improved.

First Modified Embodiment

Figure 4:
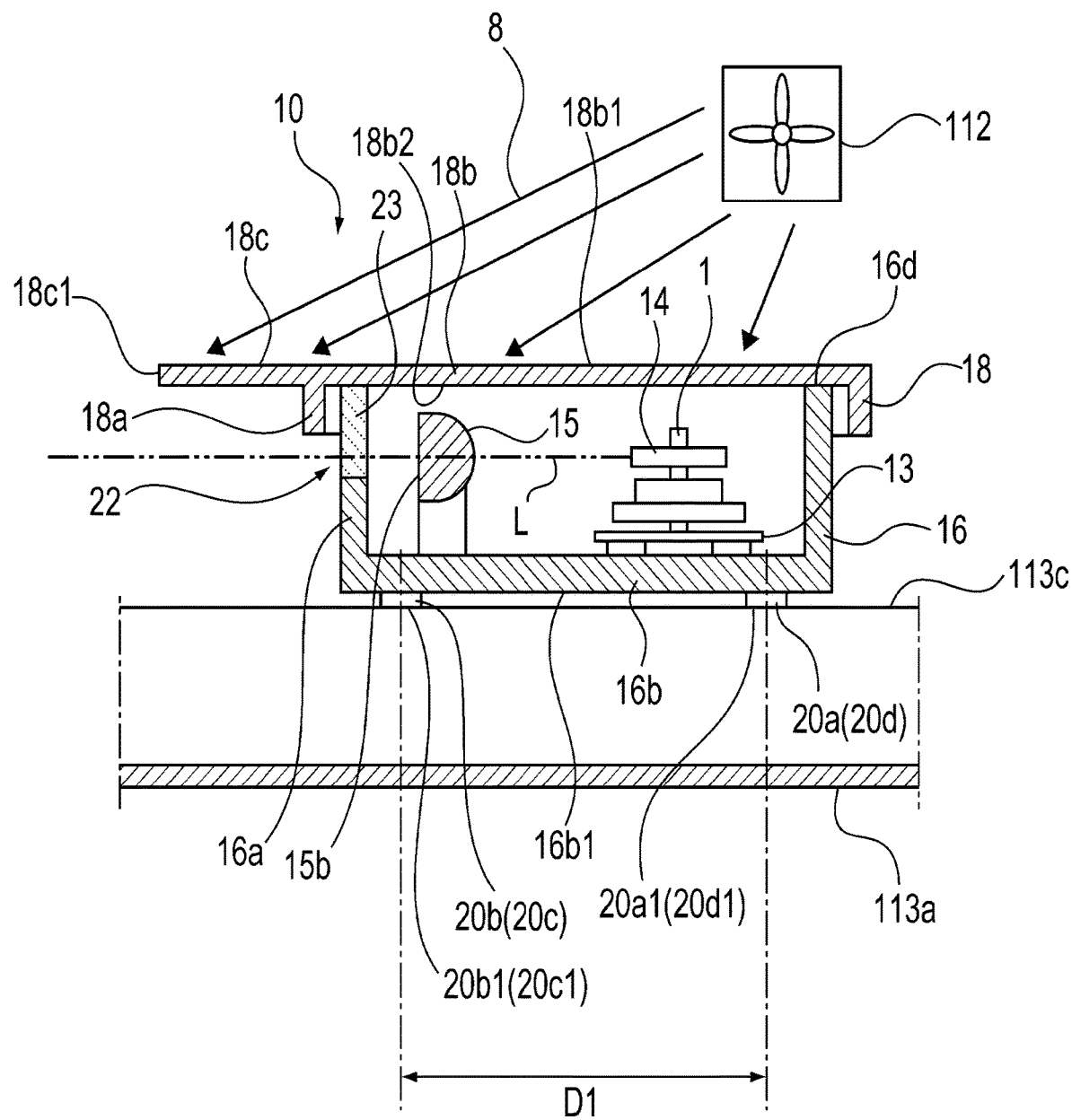
FIG. 4 is a sectional view showing a structure of an optical scanning apparatus in a first modified embodiment of the first embodiment and a flow of the air by the fan.

An optical scanning apparatus shown in FIG. 4 is different from the optical scanning apparatus shown in FIG. 2 in that the emitting port 22 is provided with a plate-like light-transmitting member (for example, glass) 23 through which the laser light L passes. Even in such a constitution, the amount of the air blowing toward the light-transmitting member 23 is suppressed by the extended portion 18c, so that an amount of the dust or the like deposited on the light-transmitting member 23 can be reduced.

Figure 5:
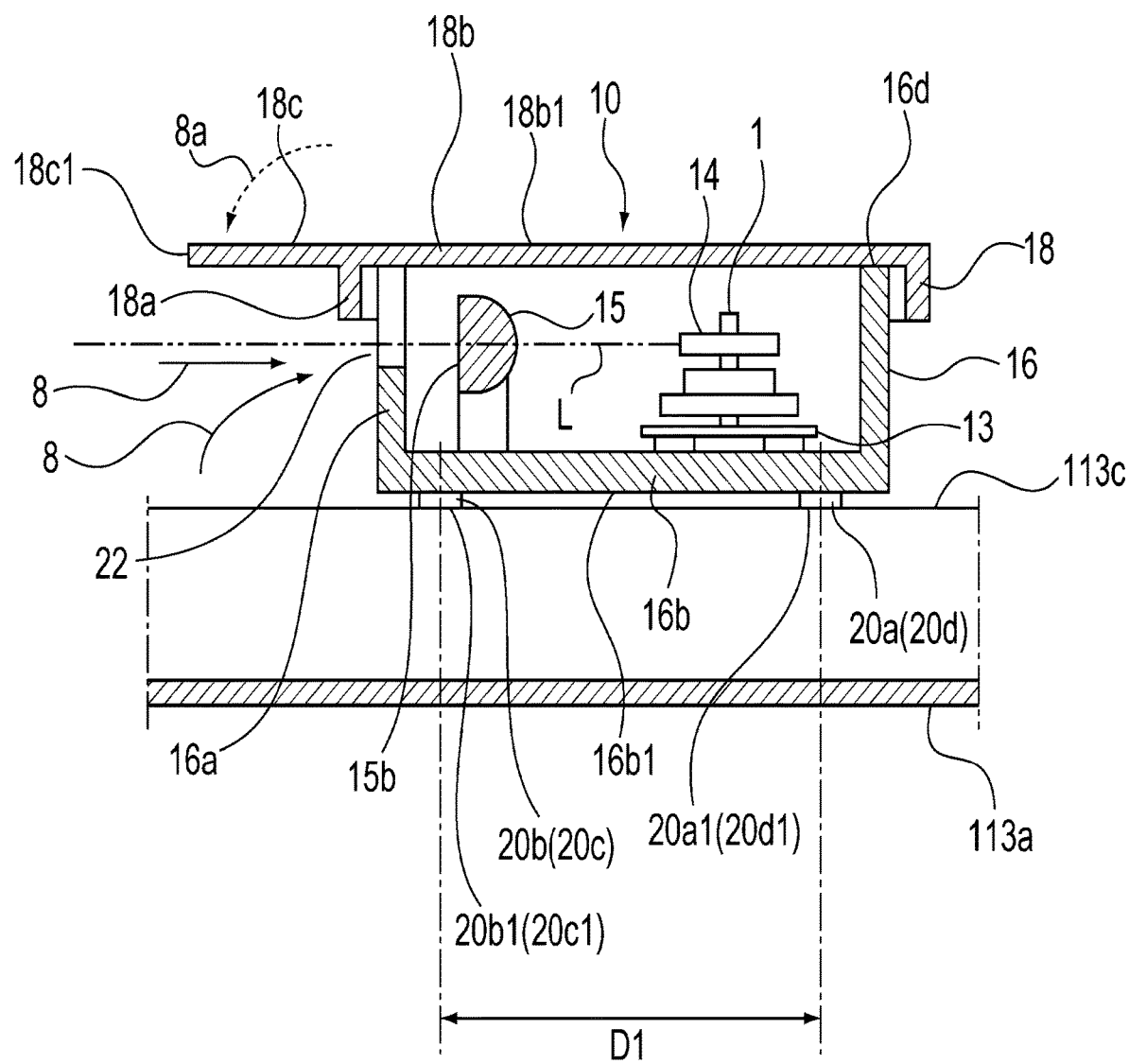
FIG. 5 is a sectional view showing the optical scanning apparatus in the first embodiment and a flow of the air by rotation of a polygonal mirror.

FIG. 5 is different from FIG. 2 in that the image forming apparatus 110 is not provided with the fan 112. When the polygonal mirror 14 provided on the scanner motor 13 rotates, a periphery thereof is put under negative pressure, so that the air is attracted toward the polygonal mirror 14. As a result, the air 8 flows from the outside of the optical scanning apparatus 10 toward the emitting port 22.

Of the air 8 flowing toward the emitting port 22 by rotation of the polygonal mirror 14, as regards the air 8a containing the dust on the outside upper portion of the cover 18, the flow thereof toward the emitting port 22 is blocked by the extended portion 18c. Therefore, also in the image forming apparatus 110 provided with no fan 112, an effect similar to the above-described effect can be obtained.

Second Modified Embodiment

Figure 6:
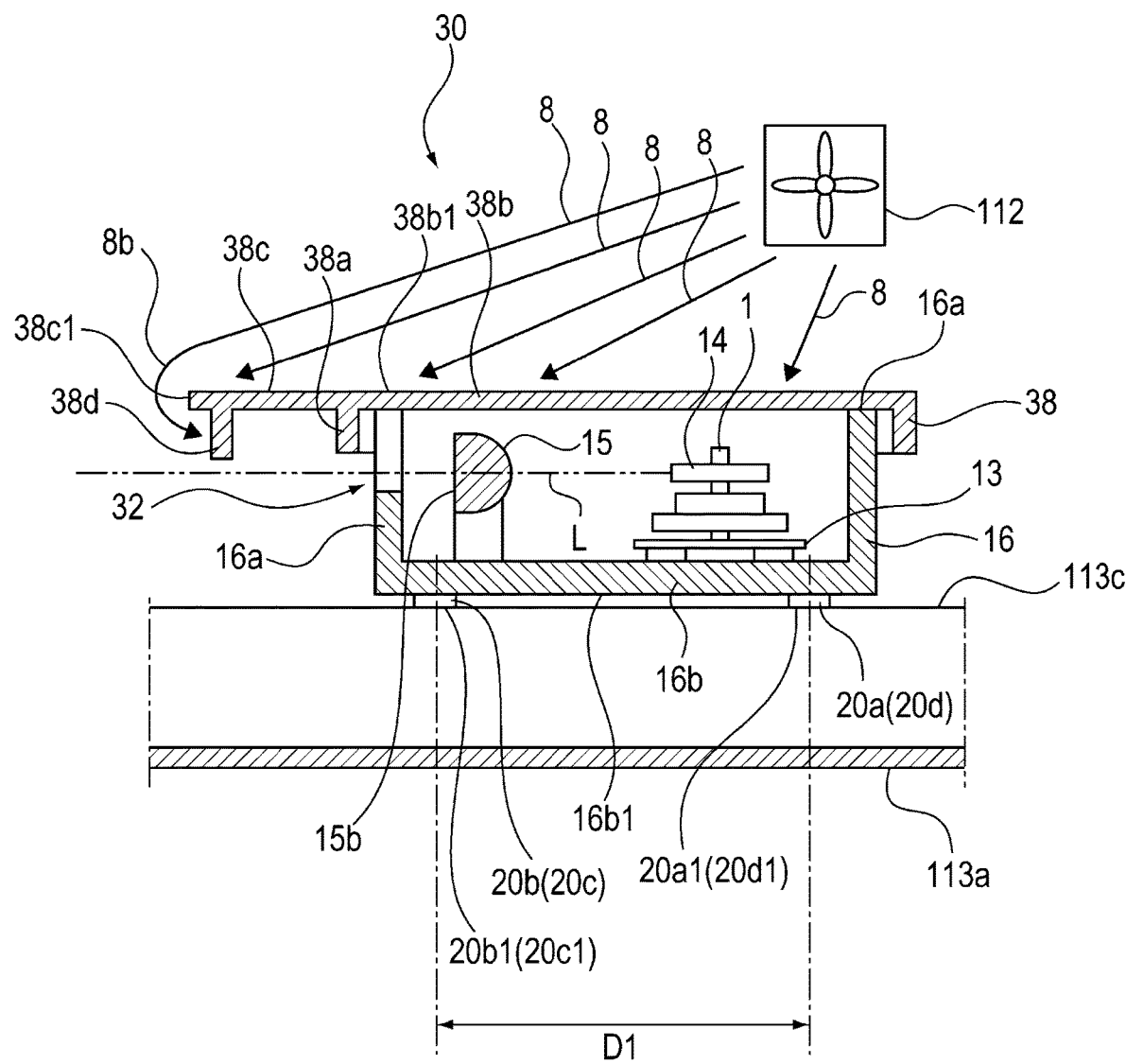
FIG. 6 is a sectional view showing a structure of an optical scanning apparatus in a second modified embodiment of the first embodiment and a flow of the air by the fan.

An optical scanning apparatus 30 shown in FIG. 6 is different from the optical scanning apparatus 10 shown in FIG. 2 in that a cover 38 is provided with a second cover rib 38d in addition to a cover rib 38a having the same structure as the cover rib 18a shown in FIG. 2.

As shown in FIG. 6, the optical box rib 16a and the cover rib 38a which extend toward the laser light L from the bottom plate 16b of the optical box 16 and a top plate 38b of the cover 38, respectively, are provided. The optical box rib 16a and the cover rib 38a are provided on a side downstream of the optical surface 15b, disposed on the laser light L emitting side of the toric lens 15, with respect to the emitting direction of the laser light L. From the emitting port 32 defined by the optical box rib 16a and the cover rib 38a toward the downstream side of the emitting direction of the laser light L, the extended portion 38c extending along the top plate 38b of the cover 38 is provided.

In the neighborhood of a free end portion 38c1 of the extended portion 38c on a downstream end side of the emitting direction of the laser light L, the second cover rib 38d provided with respect to a direction toward the laser light L is disposed. Above the optical scanning apparatus 30, the fan 112 is provided. The air 8 flows from the fan 112 toward the top surface 38b1 of the optical scanning apparatus 30 and impinges on the top surface 38b1 of the cover 38 including the extended portion 38c.

The case where an air flow rate of the fan 112 increases with an increasing print speed of the image forming apparatus 110 and the air 8b which is a part of the air 8 from the fan 112 gets over the free end portion 38c1 of the extended portion 38c and flows toward the emitting port 32 will be considered. Even in such a case, according to this modified embodiment, the air 8b from the fan 112 is blocked by the second cover rib 38d provided in the neighborhood of the free end portion 38c1 of the extended portion 38c. For that reason, even in the case where the air flow rate of the fan 112 increase, an effect similar to the above-described effect can be obtained.

Third Modified Embodiment

Figure 7:
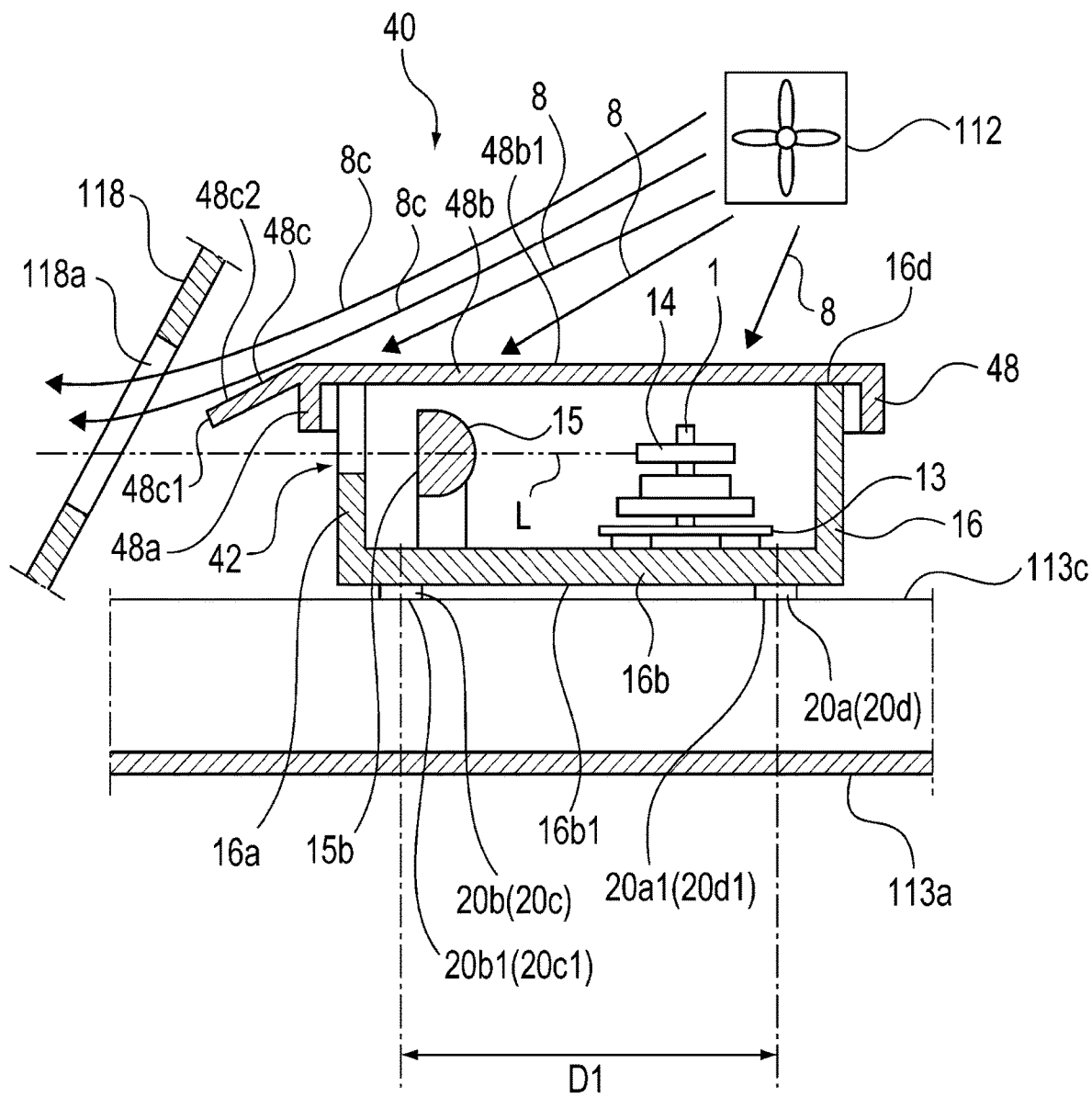
FIG. 7 is a sectional view showing a structure of an optical scanning apparatus in a third modified embodiment of the first embodiment and a flow of the air by the fan.

FIG. 7 is a sectional view showing a structure of an optical scanning apparatus in a third modified embodiment of this embodiment and a flow of the air 8 by the fan 112. As shown in FIG. 7, in an optical scanning apparatus 40 in this modified embodiment, an upper opening 16d of the optical box 16 is closed (covered) by a cover 48 made of resin or metal. As shown in FIG. 7, the optical box rib 16a and a cover rib 48a which extend toward the laser light L from the bottom plate 16b of the optical box 16 and a top plate 48b of the cover 48, respectively, are provided. The optical box rib 16a and the cover rib 48a are provided on a side downstream of the optical surface 15b, disposed on the laser light L emitting side of the toric lens 15, with respect to the emitting direction of the laser light L.

The cover 48 is provided with an extended portion 48c extending toward the laser light L while being inclined with a predetermined angle relative to a top surface 48b1 of the top plate 48b of the cover 48. The extended portion 48c is inclined in a direction toward the laser light L as the laser light L emitted through the emitting port 42 travels toward a downstream side of the emitting direction thereof.

The air 8 from the fan 112 impinges on the top surface 48b1 of the cover 48 and an upper surface 48c2 of the extended portion 48c. In the neighborhood of the optical scanning apparatus 40 of the image forming apparatus 110, a main assembly frame 118 provided with an emitting window 118a consisting of a through hole through which the laser light L passes on a side further downstream of the extended portion 48c with respect to the emitting direction of the laser is provided. The extended portion 48c provided to the cover 48 of the optical scanning apparatus 40 is inclined toward the emitting window 118a.

According to this modified embodiment, even when the main assembly frame 118 of the image forming apparatus 110 is provided in the neighborhood of the optical scanning apparatus 40, by the extended portion 48c, the air 8 flowing from the fan 112 toward the cover 48 flows along the upper surface 48c2 of the extended portion 48c toward the emitting window 118a which is the through hole provided in the main assembly frame 118 and then passes through the emitting window 118a.

Further, the free end portion 48c1 of the extended portion 48c disposed on the downstream side of the emitting direction of the laser light L is in a position sufficiently remote from the optical surface 15b of the toric lens 15 on the downstream side of the emitting direction of the laser light L. By this, the air 8 flowing toward the emitting port 42 is blocked by the extended portion 48c, so that the air 8 containing the dust does not stagnate in the neighborhood of the emitting port 42. For that reason, in the constitution of the image forming apparatus 110, even in the case where the main assembly frame 118 is provided in the neighborhood of the optical scanning apparatus 40, the air 8 containing the dust does not stagnate in the neighborhood of the emitting port 42, and therefore, an effect similar to the above-described effect can be obtained.

Second Embodiment

Figure 8:
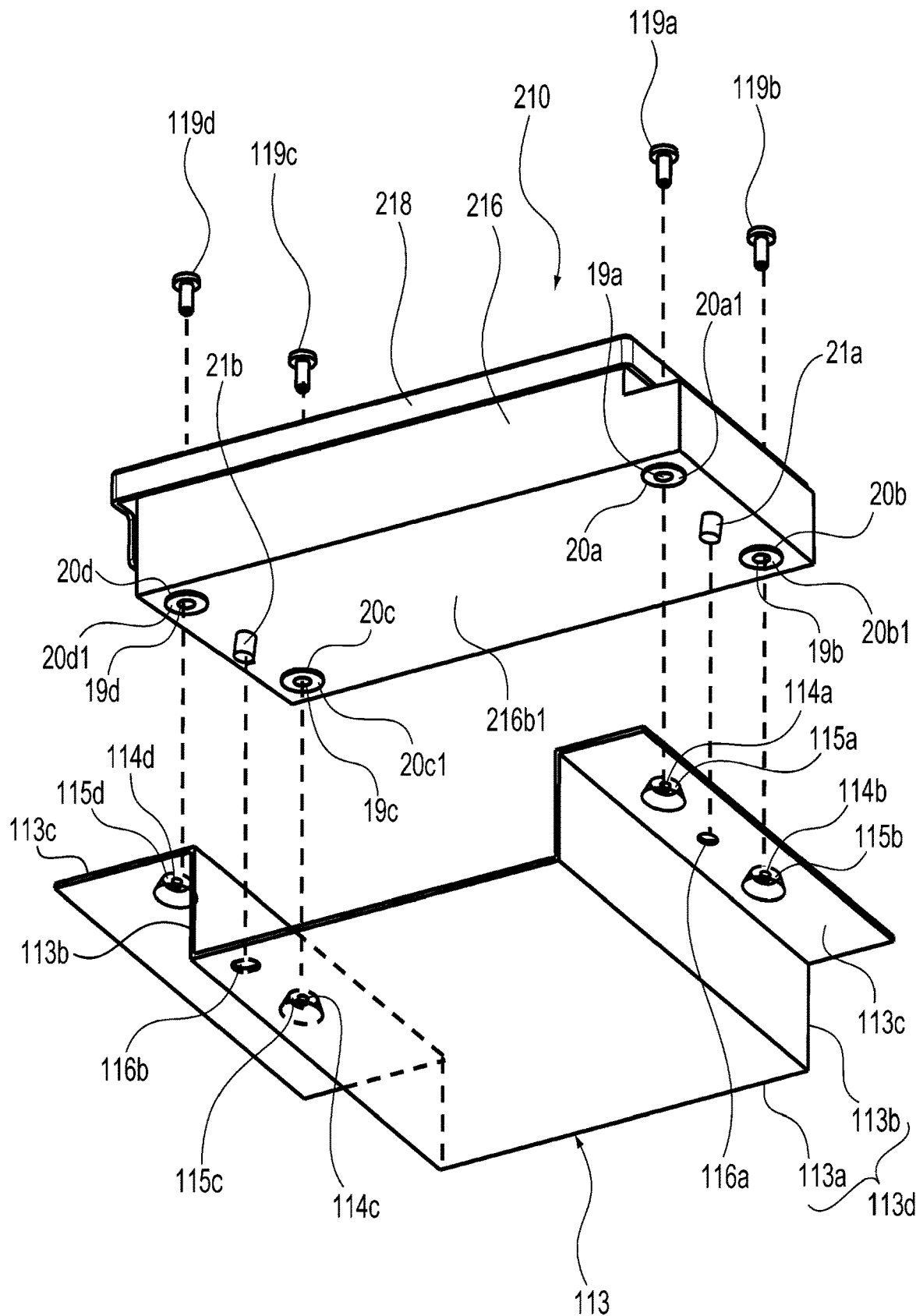
FIG. 8 is a perspective view of an optical scanning apparatus in a second embodiment and an optical table provided in the image forming apparatus as seen from below.

A constitution of a second embodiment of the image forming apparatus 110 including the optical scanning apparatus according to the present invention will be described with reference to FIGS. 8 to 12. Incidentally, members (portions) constituted similarly as in the above-described first embodiment are represented by the same reference numerals or symbols, or are represented by adding the same member (portion) names even when reference numerals or symbols are different from those in the first embodiment and will be omitted from description. FIG. 8 is a perspective view of an optical scanning apparatus 210 in this embodiment and an optical table 113 provided in the image forming apparatus 110 as seen from below the optical scanning apparatus 210. As shown in FIG. 8, the optical scanning apparatus 210 is provided by being fixed to the optical table 113 which is a part of a frame of the image forming apparatus 110.

<Supporting Member>

The optical table 113 as a supporting member for supporting an optical box 216 is constituted by a pair of fixing plates 113c to which a lower surface 216b1 (fixing surface) of a bottom plate 216b of the optical box 216, and a duct portion 113d continuous to each of the fixing plates 113c. The duct portion 113d is constituted by a bottom plate 113a and a pair of side plates 113b each standing from the bottom plate 113a in a direction substantially perpendicular to the bottom plate 113a. Each of the fixing plates 113c is extended in parallel to the bottom plate 113a toward an outside of the associated side plate 113b in a direction substantially perpendicular to the side plate 113b. The optical table 113 includes the bottom plate 113a, the pair of side plates 113b and the pair of fixing plates 113c and is prepared in a hat shape in cross section.

The bottom plate 216b of the optical box 216 is provided with through holes 19a to 19d, and at peripheries of the through holes 19a to 19d in the lower surface 216b1 of the bottom plate 216b, bases 20a to 20d are provided. Lower surfaces of the bases 20a to 20d are mounting reference surfaces 20a1 to 20d1.

On the other hand, the fixing plates 113c of the optical table 113 are provided with screw holes 114a to 114d at positions opposing the through holes 19a to 19d, respectively, provided in the bottom plate 216b of the optical table 216. Further, the fixing plates 113c of the optical table 113 are provided with bearing surfaces 115a to 115d opposing the mounting reference surfaces 20a1 to 20d1, respectively, of the bases 20a to 20d provided on the lower surface 216b1 of the bottom plate 216b of the optical box 216. The bearing surfaces 115a to 115d are provided at peripheries of the screw holes 114a to 114d, respectively.

Further, on the lower surface 216b1 of the bottom plate 216b of the optical box 216, pins 21a and 21b projecting downward are provided. On the other hand, in the fixing plates 113c of the optical table 113, at positions opposing the pins 21a and 21b provided on the lower surface 216b1 of the bottom plate 216b of the optical box 216, a round hole 116a consisting of a through hole and an elongated hole 116b consisting of a through hole are provided, respectively.

The pins 21a and 21b projecting from the lower surface 216b1 of the bottom plate 216b of the optical box 216 are engaged with the round hole 116a and the elongated hole 116b, respectively, provided in the fixing plate 113c of the optical table 113. By this, the optical box 216 is positioned relative to the optical table 113. In a state in which the optical box 216 is positioned relative to the optical table 113, screws 119a to 119d are inserted into the through holes 19a to 19d, respectively, provided in the bottom plate 216b of the optical box 216 and then are fastened in the screw holes 114a to 114d, respectively, provided in the fixing plates 113c of the optical table 113. Thus, by fastening the screws 119a to 119d in the screw holes 114a to 114d, respectively, so that the optical box 216 is fixed to the optical table 113.

Figure 9:
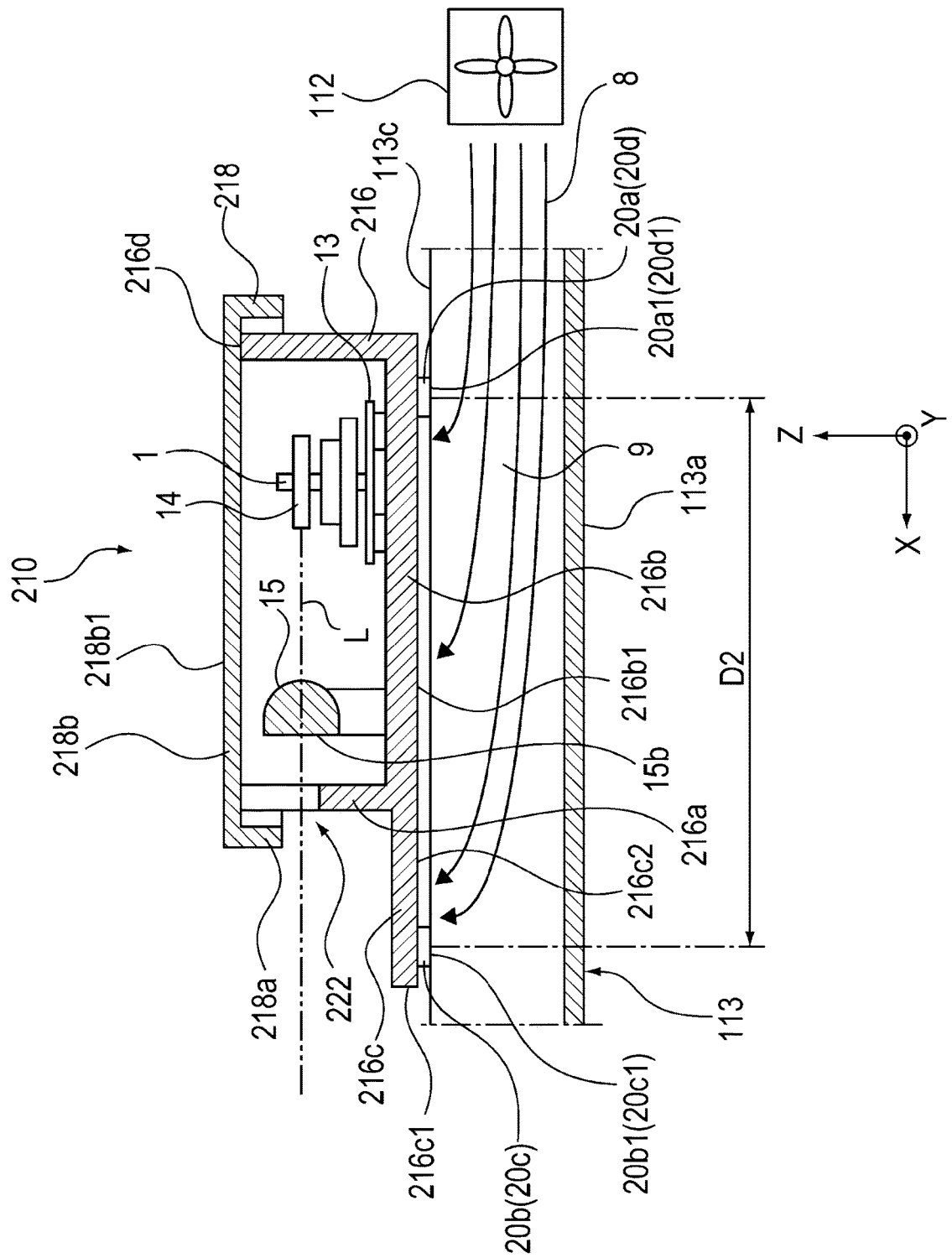
FIG. 9 is a sectional view showing the optical scanning apparatus in the second embodiment and a flow of the air by the fan.

Next, by using FIG. 9, the optical scanning apparatus 210 in this embodiment and the flow of the air 8 by the fan 112 will be described. FIG. 9 is a sectional view showing the optical scanning apparatus 210 in this embodiment and the flow of the air 8 by the fan 112. As a part of the optical box 216, an extended box portion 216c extended toward a side downstream of an emitting port 222 in the emitting direction of the laser light L is provided.

The extended box portion 216c is provided with mounting reference surfaces 20b1 and 20c1 as mounting portions fixed to the fixing plate 113c of the optical table 113 by mounting the optical scanning apparatus 210 to the fixing plate 113c of the optical table 113 provided in the image forming apparatus 100. The mounting reference surfaces 20b1 and 20c1 are constituted by the lower surfaces of the bases 20b and 20c, respectively, provided on the lower surface 216c21 in the neighborhood of a free end portion 216c1 of the extended box portion 216c.

As shown in FIG. 9, the optical box 216 is provided with an optical box rib 216a. A cover 218 is provided with a cover rib 218a. The optical box rib 216a and the cover rib 218a are provided on a side downstream of the optical surface 15a of the toric lens 15 with respect to the emitting direction of the laser light L passing through the optical surface 15b.

Further, on a side downstream, with respect to the emitting direction of the laser light L, of the emitting port 222 defined by the optical box rib 216a and the cover rib 218a, the extended box portion 216c extended as the part of the optical box 216 along the lower surface 216b1 of the bottom plate 216b of the optical box 216 is provided. On the lower surface 216c2 positioned in the neighborhood of the free end portion 216c1 of the extended box portion 216c, bases 24b and 24c provided with the mounting reference surfaces 20b1 and 20c1 are provided. A length of the extended box portion 216c may also preferably be in a range of 5-20 mm.

The fan 112 provided in the image forming apparatus 110 is disposed at a portion outside and below the bottom plate 216b of the optical box 216 on a side opposite from the emitting port 222 with respect to the emitting direction of the laser light L. The fan 112 is disposed at a position where the fan 112 sends (blows) the air 8 into an air passage 9 formed by the lower surface 216b1 (fixing surface) of the bottom plate 216b of the optical box 216 and the duct portion 113d. The air 8 flowing from the fan 112 toward the lower surface 216b1 of the bottom plate 216b of the optical box 216 in the air passage 9 is blocked by the extended box portion 216c. According to this embodiment, even in the case where the fan 112 is provided below the optical scanning apparatus 210, the air 8 containing the dust from the fan 112 is blocked by the extended box portion 216c, so that stagnation of the air containing the dust in the neighborhood of the emitting port 222 can be prevented. By this, it becomes possible to obtain an effect similar to the above-described effect.

Figure 10:
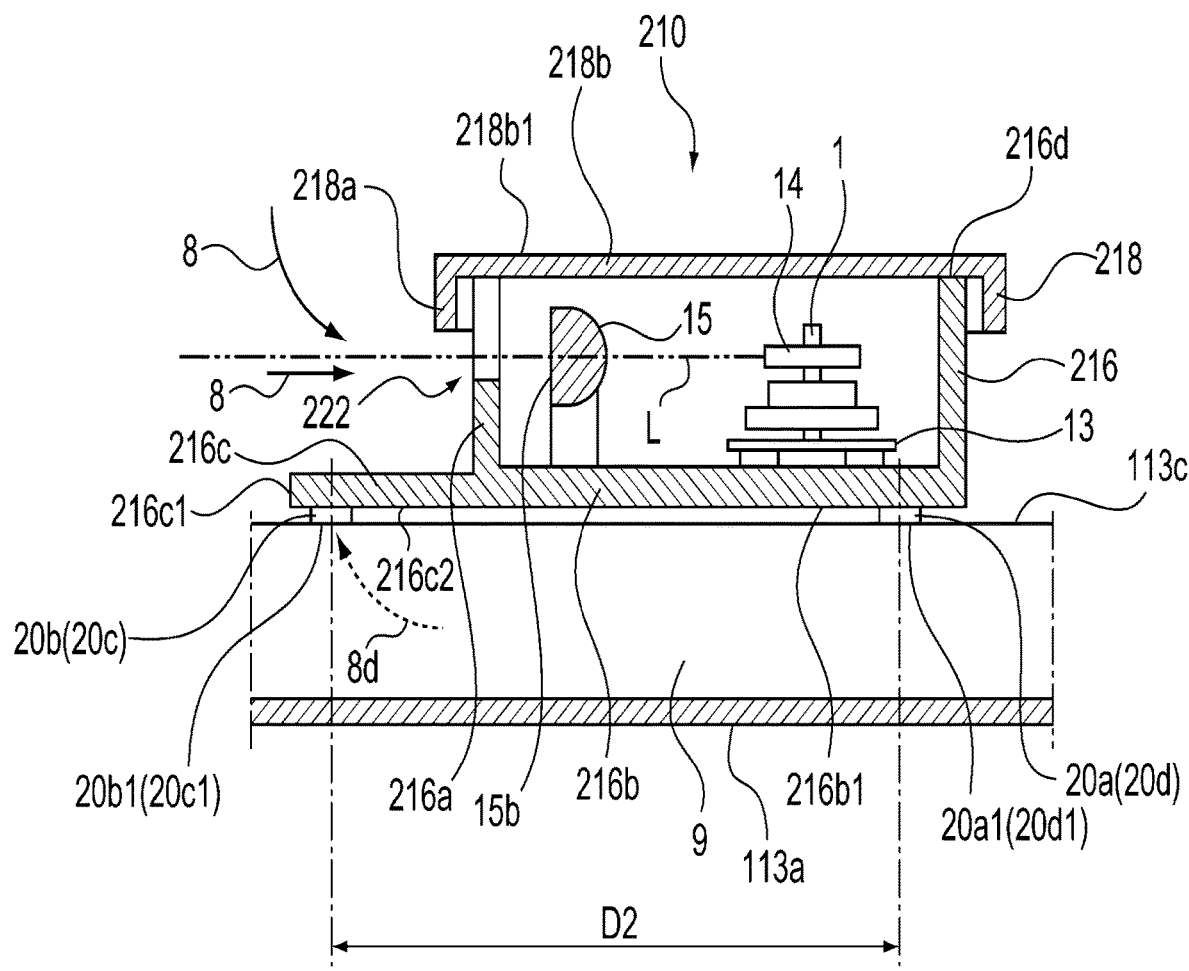
FIG. 10 is a sectional view showing the optical scanning apparatus in the second embodiment and a flow of the air by rotation of a polygonal mirror.

FIG. 10 is different from FIG. 9 in that the image forming apparatus 110 is not provided with the fan 112. On the lower surface 216c2 positioned in the neighborhood of the free end portion 216c1 of the extended box portion 216c, the bases 20b and 20c provided with the mounting reference surfaces 20b1 and 20c1 are provided. For this reason, an interval (distance) D2 between the mounting reference surface 20a1 (20d1) and the mounting reference surface 20b1 (20c1) with respect to an X-axis direction is increased.

Incidentally, a variation in height of the respective mounting reference surfaces 20a1 to 20d1 occurs in some cases. Here, the mounting reference surfaces 20a1 and 20d1 of the bases 20a and 20d provided only on the lower surface 16b1 of the bottom plate 16b of the optical box 16 in the optical scanning apparatuses 10, 30 and 40 shown in FIGS. 1 to 7 will be considered. Further, the mounting reference surfaces 20b1 and 20c1 of the bases 20b and 20c will be considered. Further, the case where an interval D1 between the mounting reference surface 20a1 (20d1) and the mounting reference surface 20b1 (20c1) with respect to the X-axis direction will be considered. Compared with the interval D1, by the increase in interval D2, it is possible to reduce a variation in inclination of the optical scanning apparatus 210 relative to the surface of the photosensitive drum 103. By this, a variation in irradiation position of the surface of the photosensitive drum 103 with the laser light L is reduced.

As a result, it is possible to improve print accuracy without separately providing a mechanism for correcting the position of the laser light L with which the surface of the photosensitive drum 103 is irradiated in the optical scanning apparatus and without separately providing a mechanism for correcting a print position on the recording material P in the image forming apparatus 110. By this, it becomes possible to provide a relatively inexpensive image forming apparatus 110 without inviting an increase in cost due to separate provision of the mechanism for improving the print accuracy.

Next, the optical scanning apparatus 210 in this embodiment and the flow of the air 8 by rotation of the polygonal mirror 14 will be described using FIG. 10. FIG. 10 is a sectional view showing the optical scanning apparatus 210 in this embodiment and the flow of the air 8 by rotation of the polygonal mirror 14. In FIG. 9, an example of the case where the image forming apparatus 110 is provided with the fan 112 was described. On the other hand, as shown in FIG. 10, even in the case where the image forming apparatus 110 is not provided with the fan 112, when the polygonal mirror 14 provided on the scanner motor 13 rotates, a periphery of the polygonal mirror 14 is put in negative pressure, so that the air is attracted toward the polygonal mirror 14. As a result, the air containing the dust stagnating in the neighborhood of the emitting port 222 which is an opening of the optical scanning apparatus 210 becomes the air 8 and flows toward the emitting port 222.

Depending on the image forming apparatus 110, a density of the dust contained in the air is large at a portion below the optical scanning apparatus 210 than at a portion above the optical scanning apparatus 210 in some cases. In the constitution of this embodiment, even when the air containing the dust on the outside of the optical box 216 becomes the air 8d by rotation of the polygonal mirror 14, the air 8d is blocked by the extended box portion 216c. By this, the air 8d containing dust does not blow toward the emitting port 222, so that an effect similar to the above-described effect can be obtained.

First Modified Embodiment

Figure 11:
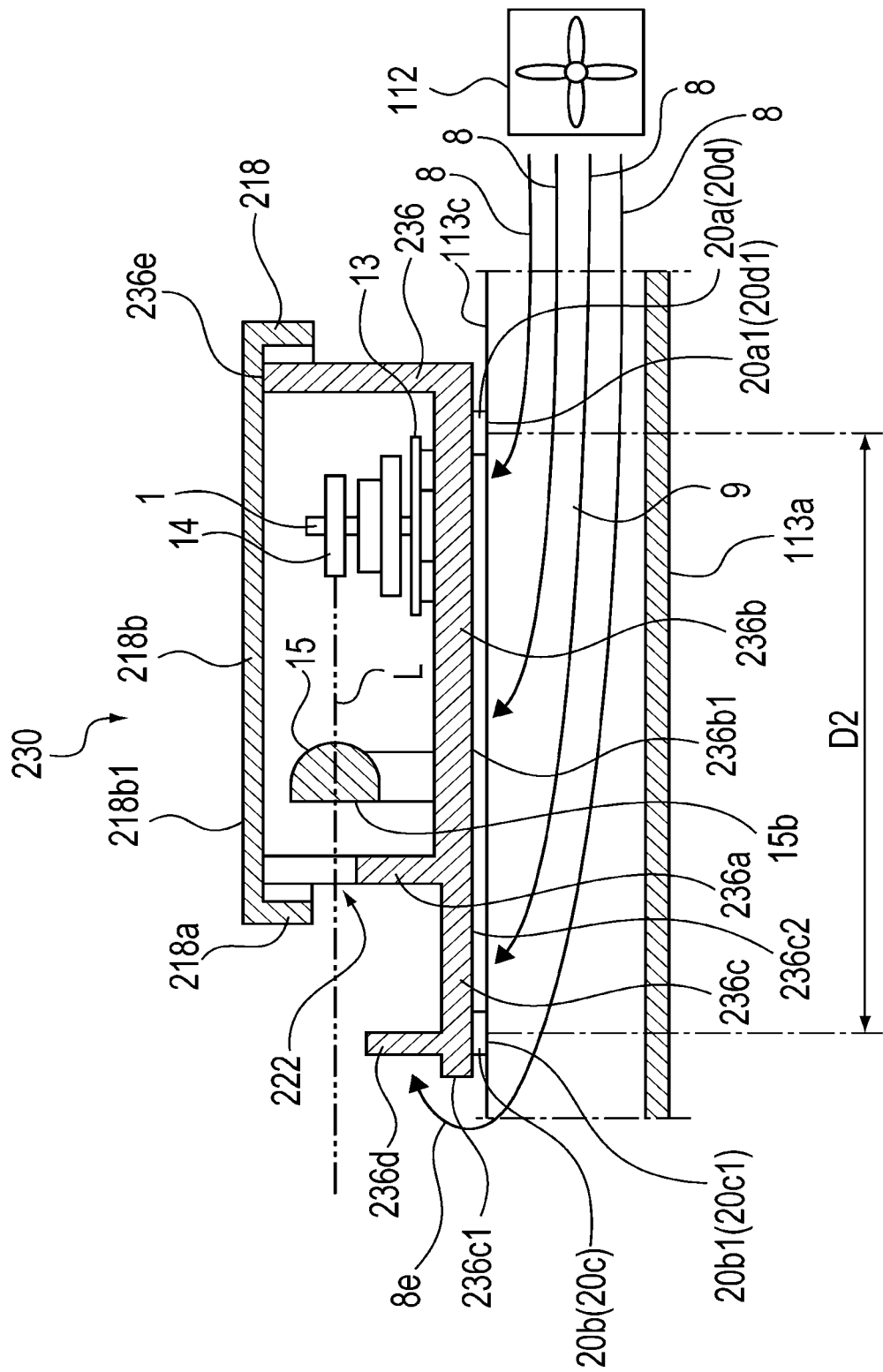
FIG. 11 is a sectional view showing the optical scanning apparatus in a first modified embodiment of the second embodiment and a flow of the air by the fan.

An optical scanning apparatus in a first modified embodiment of this embodiment and a flow of the air 8 by the fan 112 will be described using FIG. 11. FIG. 11 is a sectional view showing the optical scanning apparatus in the first modified embodiment of this embodiment and the flow of the air 8 by the fan 112. Incidentally, members (portions) constituted similarly as in the above-described embodiments are represented by the same reference numerals or symbols and will be omitted from description. As shown in FIG. 11, an optical box rib 236a and a cover rib 218a which extend toward the laser light L from a bottom plate 236b of an optical box 236 and a top plate 218b of a cover 218, respectively, are provided. The optical box rib 236a and the cover rib 218a are provided on a side downstream of the optical surface 15b, disposed on the laser light L emitting side of the toric lens 15 provided in the optical scanning apparatus 230, with respect to the emitting direction of the laser light L. The top plate 218b of the cover 218 includes a top surface 218b1. On a side downstream of the emitting port 222 defined by the optical box rib 236a and the cover rib 218a with respect to the emitting direction of the laser light L, as a part of the optical box 236, an extended box portion 236c extending along a lower surface 236b1 of a bottom plate 236b of the optical box 236 is provided. Further, in the neighborhood of a free end portion 236c1 of the extended box portion 236c on a downstream end side of the emitting direction of the laser light L, a second optical box rib 236d provided with respect to a direction toward the laser light L is disposed. The optical box 236 is provided with an upper opening 236e and the upper opening 236e is closed (covered) by the cover 218.

The case where an air flow rate of the fan 112 increases with an increasing print speed of the image forming apparatus 110 and the air 8c which is a part of the air 8 from the fan 112 gets over the free end portion 236c1 of the extended box portion 236c and flows toward the emitting port 222 will be considered. Even in such a case, according to this modified embodiment, the flow of the air 8e from the fan 112 toward the emitting port 222 is blocked by the second optical box rib 236d provided on the extended box portion 236c. Further, on the lower surface 235c2 in the neighborhood of the free end portion 236c1 of the extended box portion 236c, the bases 20b and 20c provided with the mounting reference surfaces 20b1 and 20c1 are provided. By this, an effect similar to the above-described effect can be obtained.

Second Modified Embodiment

Figure 12:
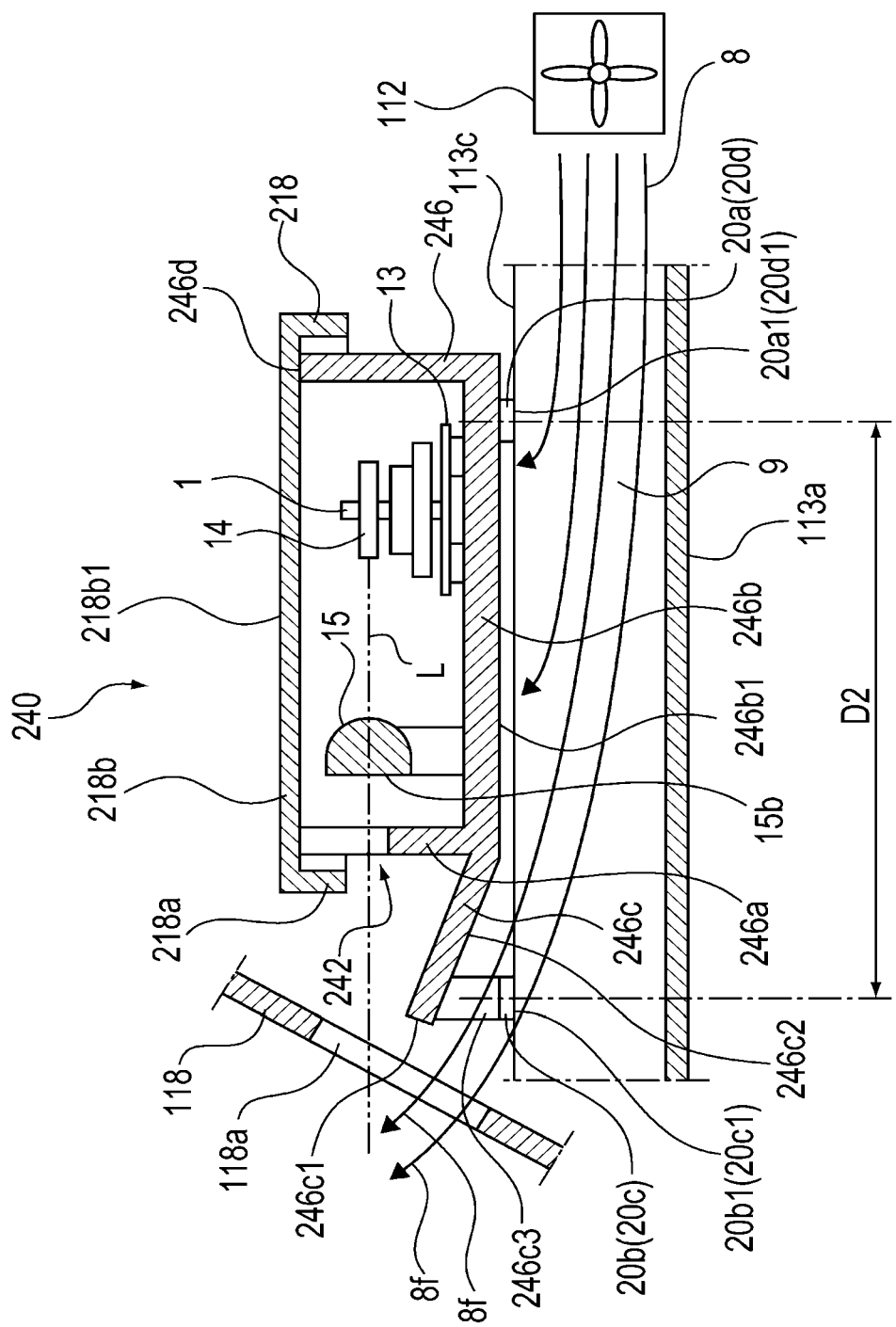
FIG. 12 is a sectional view showing the optical scanning apparatus in a second modified embodiment of the second embodiment and a flow of the air by the fan.

An optical scanning apparatus in a third modified embodiment of this embodiment and a flow of the air 8 by the fan 112 will be described using FIG. 12. FIG. 12 is a sectional view showing the optical scanning apparatus in the first modified embodiment of this embodiment and the flow of the air 8 by the fan 112. Incidentally, members (portions) constituted similarly as in the above-described embodiments are represented by the same reference numerals or symbols and will be omitted from description. In this modified embodiment, as shown in FIG. 12, the image forming apparatus 110 is provided with the main assembly frame 118 including the emitting window 118a consisting of a through hole, through which the laser light L passes, in the neighborhood of the optical scanning apparatus 240 between the optical scanning apparatus 240 and the photosensitive drum 103.

As shown in FIG. 12, an optical box rib 246a and a cover rib 218a which extend toward the laser light L from a bottom plate 246b of an optical box 246 and the top plate 218b of the cover 218, respectively, are provided. The optical box rib 246a and the cover rib 218a are provided on a side downstream of the optical surface 15b, disposed on the laser light L emitting side of the toric lens 15 provided in the optical scanning apparatus 240, with respect to the emitting direction of the laser light L. Further, the optical box 246 of the optical scanning apparatus 240 is provided with an extended box portion 246c inclined from the bottom plate 246b toward the emitting window 118a in a direction in which the extended box portion 246c approaches the laser light L. The optical box 246 is provided with an upper opening 246d, and the upper opening 246d is closed (covered) by the cover 218.

The extended box portion 246c is inclined in a direction toward the laser light L as the laser light L emitted through the emitting port 242 travels toward a downstream side of the emitting direction thereof. On a lower surface 246c1 in the neighborhood of the free end portion 246c1 of the extended box portion 246c, a pair of leg portions 246c3 are provided, and the leg portions 246c3 are provided at their lower portions with bases 20b and 20c on which the mounting reference surfaces 20b1 and 20c1 are formed. The mounting reference surfaces 20b1 and 20c1 are provided at positions opposing bearing surfaces 115b and 115c provided on the fixing plate 113c of the optical table 113.

According to this modified embodiment, the bottom plate 246c inclined toward the emitting window 118a of the main assembly frame 118 provided in the neighborhood of the optical scanning apparatus 240 is provided.

By this, of the air 8 flowing from the fan 112 toward the lower surface 246b1 of the optical box 246 in the air passage 9, a part of the air 8f flows along the lower surface 246c2 of the bottom plate 246c toward the emitting window 118a provided in the main assembly frame 118. Thereafter, the air 8f of passes through the emitting window 118a.

Further, the flow of the air 8f flowing toward the emitting port 242 is blocked by the bottom plate 246c.

By this, even in the case where the main assembly frame 118 of the image forming apparatus 110 is provided in the neighborhood of the emitting port 242 of the optical scanning apparatus 240, the air 8 containing the dust does not stagnate in the neighborhood of the emitting port 242, and therefore, an effect similar to the above-described effect can be obtained. Other constitutions are similar to those in the above-described first embodiment, so that an effect similar to the above-described effect can be obtained.

Third Embodiment

A constitution of a third embodiment of the image forming apparatus 110 including the optical scanning apparatus according to the present invention will be described with reference to FIGS. 13 to 17. FIG. 13 is a perspective view showing a structure of an optical scanning apparatus in the third embodiment. Incidentally, members (portions) constituted similarly as in the above-described first embodiment are represented by the same reference numerals or symbols, or are represented by adding the same member (portion) names even when reference numerals or symbols are different from those in the above-described embodiments and will be omitted from description.

Figure 14:
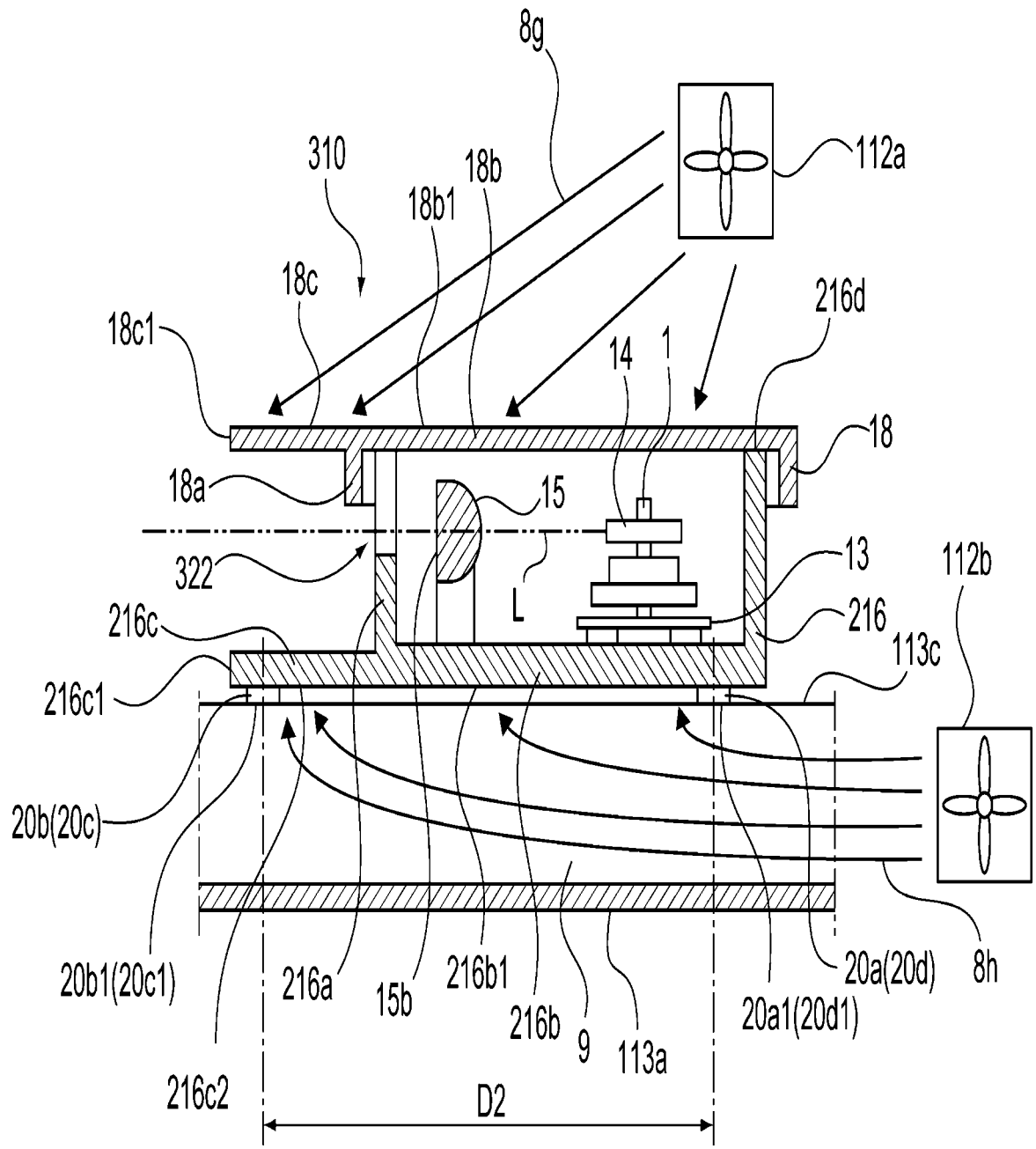
FIG. 14 is a sectional view showing the optical scanning apparatus in the third embodiment and a flow of the air by the fan.

By using FIG. 14, the optical scanning apparatus 310 in this embodiment and the flows of the airs 8g and 8h by fans 112a and 112b will be described. FIG. 14 is a sectional view showing the optical scanning apparatus 310 in this embodiment and the flows of the airs 8g and 8h by the fans 112a and 112b. As shown in FIG. 14, the optical box rib 216a and the cover rib 18a which extend from the bottom plate 216b of the optical box 216 and the top plate 18b of the cover 18, respectively, toward the laser light L are provided. The optical box rib 216a and the cover rib 218a are provided on a side downstream of the optical surface 15a of the toric lens 15 with respect to the emitting direction of the laser light L passing through the optical surface 15b. The upper opening 216d of the optical box 216 shown in FIG. 13 is closed (covered) by the cover 18.

On a side downstream, with respect to the emitting direction of the laser light L, of the emitting port 322 defined by the optical box rib 216a and the cover rib 218a, the extended portion 18c extended as the part of the cover 18 along the top surface 18b1 of the cover 18 is provided. Further, on a side downstream of the emitting port 322 with respect to the emitting direction of the laser light L, the extended box portion 216c extended as the part of the optical box 216 along the lower surface 216b1 of the bottom plate 216b is provided.

The free end portion 18c1 of the extended portion 18c and the free end portion 216c1 of the extended box portion 216c1 are in positions sufficiently remote from the optical surface 15b of the toric lens 15 toward the downstream side of the emitting direction of the laser light L.

Further, the fans 112a and 112b are provided on the side opposite from the emitting port 322 with respect to the emitting direction of the laser light L so as to be positioned above and below the optical scanning apparatus 310, respectively. As regards the air 8g flowing from the first fan 112a toward the cover 18 on the downstream side of the emitting direction of the laser light L, the flow thereof toward the emitting port 322 is blocked by the extended portion 18c.

The second fan 112b is disposed at a position where the second fan 112b sends (blows) the air 8h into an air passage 9 formed by the lower surface 216b1 of the bottom plate 216b of the optical box 216 and the duct portion 113d of the optical table 113. As regards the air 8h flowing from the second fan 112b toward the lower surface 216b1 of the optical box 216 in the air passage 9, the flow thereof toward the emitting port 322 is blocked by the extended box portion 216c.

On the lower surface 216c2 in the neighborhood of the free end portion 216c1 of the extended box portion 216c, the bases 20b and 20c provided with the mounting reference surfaces 20b1 and 20c1 are provided. On the lower surface 216b1 of the bottom plate 216b of the optical box 216 positioned on the side opposite from the extended box portion 216c, the bases 20a and 20b provided with the mounting reference surfaces 20a1 and 20d1 are provided. By this, it becomes possible to obtain an effect similar to the above-described effect.

Separately from the fan 112b provided below the optical scanning apparatus 310, even when the fan 112a is added to a position above the optical scanning apparatus 310, stagnation of the air 8g from the fan 112a in the neighborhood of the emitting port 322 is blocked by the extended portion 18c. By this, it becomes possible to reduce an amount of the dust deposited on the toric lens 15 and other optical component parts and thus it becomes possible to reduce a degree of an image defect such as a lowering in density generated by the deposition of the dust on the optical component parts.

Figure 15:
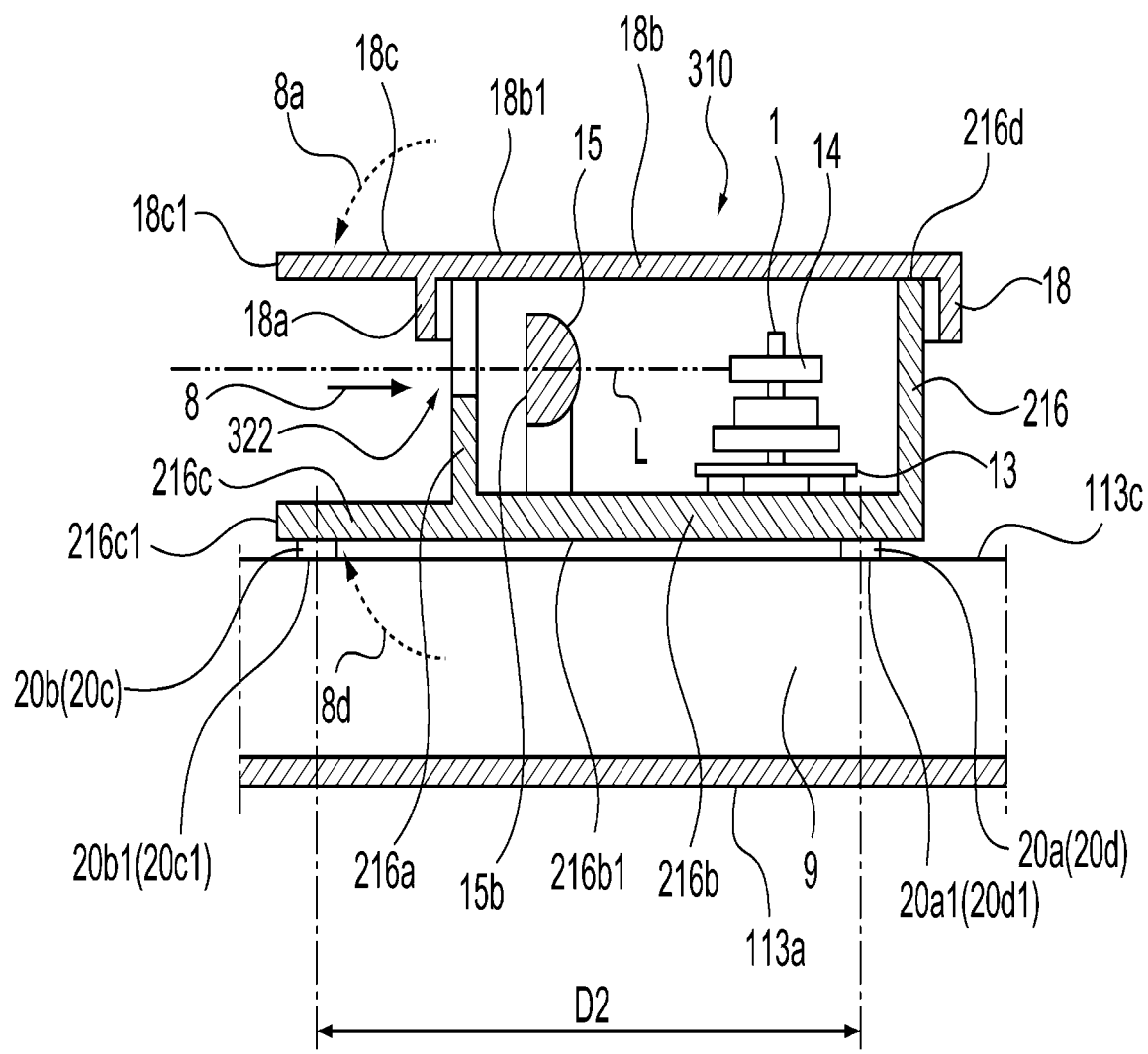
FIG. 15 is a sectional view showing the optical scanning apparatus in the third embodiment and a flow of the air by rotation of a polygonal mirror.

FIG. 15 is different from FIG. 14 in that the image forming apparatus 110 is not provided with the fans 112a and 112b. Even in such a case, as regards the air 8d at an outside lower portion of the optical box 216, the flow thereof toward the emitting port 322 is blocked by the extended box portion 216c. By this, it is possible to prevent stagnation of the airs 8a and 8d containing the dust in the neighborhood of the emitting port 322. By this, an effect similar to the above-described effect can be obtained.

First Modified Embodiment

Figure 16:
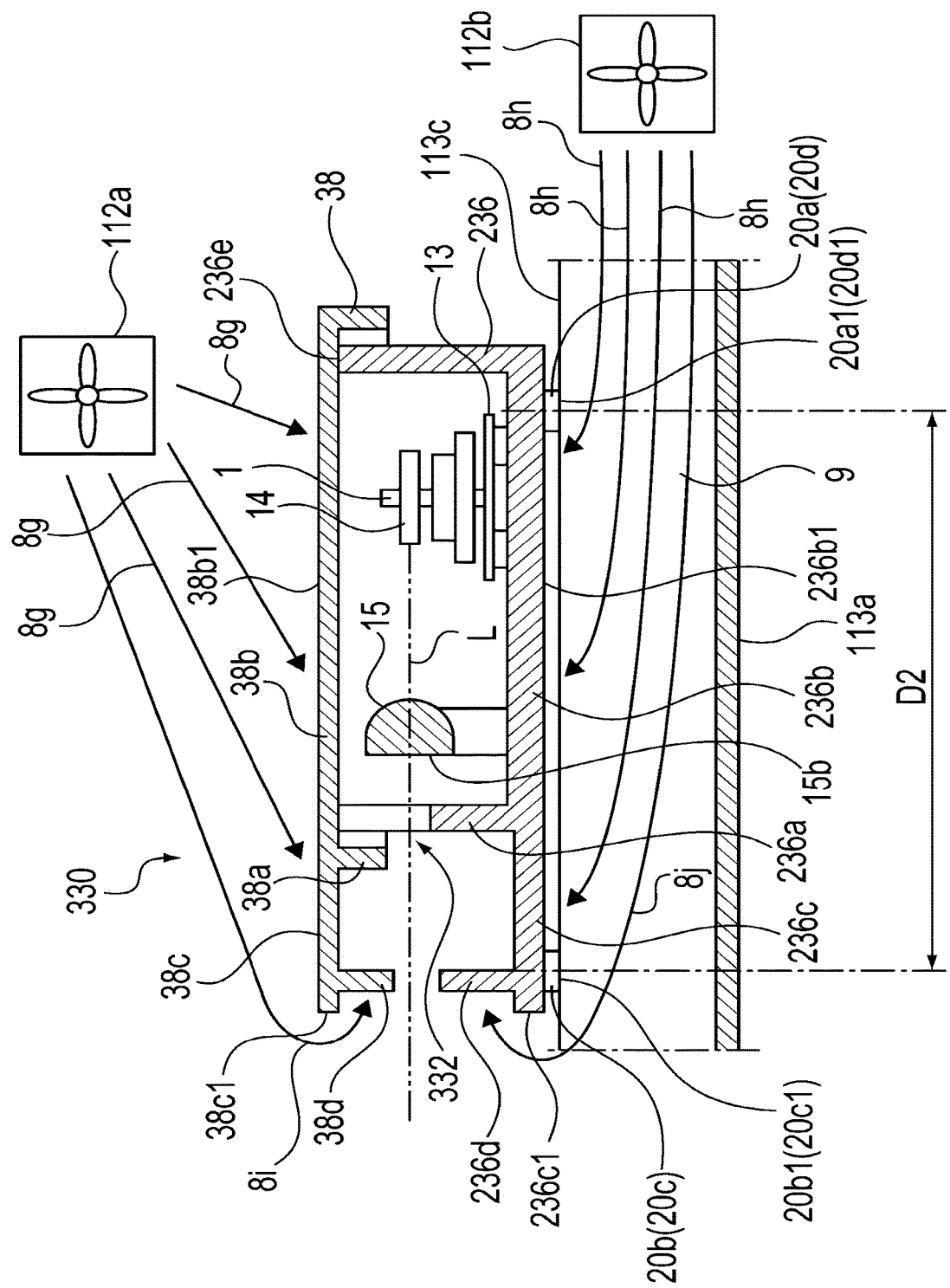
FIG. 16 is a sectional view showing the optical scanning apparatus in a first modified embodiment of the third embodiment and a flow of the air by the fan.

An optical scanning apparatus in a first modified embodiment of this embodiment and a flow of the air 8 by the fans 112a and 112b will be described using FIG. 16. FIG. 16 is a sectional view showing the optical scanning apparatus in the first modified embodiment of this embodiment and the flow of the air 8 by the fans 112a and 112b. Incidentally, members (portions) constituted similarly as in the above-described embodiments are represented by the same reference numerals or symbols and will be omitted from description.

As shown in FIG. 16, in an optical scanning apparatus 330 in this modified embodiment, an emitting port 332 defined by the optical box rib 236a and the cover rib 38a is provided. On a side downstream of the emitting port 332 with respect to the emitting direction of the laser light L, an extended portion 38c as a part of the cover 38 is provided along a top surface 38b1 of a top plate 38b of the cover 38. Further, on a side downstream of the emitting port 332 with respect to the emitting direction of the laser light L, as a part of the optical box 236, the extended box portion 236c extending along the lower surface 236b1 of the bottom plate 236b of the optical box 236 is provided.

In the neighborhoods of free end portions 38c1 and 236c1 of the extended portion 38c and the extended box portion 236c, respectively, on the downstream side of the emitting direction of the laser light L, a second cover rib 38d and a second optical box rib 236d which extends in directions toward the laser light L are provided. On a side opposite from the emitting port 332 with respect to the emitting direction of the laser light L, at a portion outside and above the cover 38, the first fan 112a is provided. On the other hand, on a side opposite from the emitting port 332 with respect to the emitting direction of the laser light L, at a portion outside and below the bottom plate 236b of the optical box 236, the second fan 112b is provided. The second fan 112b is disposed at a position where the air 8h blows into the air passage 9 formed by the lower surface 236n1 of the bottom plate 236b of the optical box 236 and the duct portion 113b of the optical table 113.

With an increase in print speed of the image forming apparatus 110, air flow rates of the fans 112a and 112b increase in some instances. At that time, the case where airs 8i and 8j which are parts of the airs 8g and 8h, respectively, get over the free end portions 38c1 and 236c of the extended portion 38c and the extended box portion 236c, respectively, and then flow toward the emitting port 332 will be considered.

Even in such a case, according to this modified embodiment, as regards the air 8i flowing from the first fan 112a toward the cover 38, the flow thereof toward the emitting port 332 is blocked by the extended portion 38c and the second cover rib 38d. Further, as regards the air 8j flowing from the second fan 112b toward the lower surface 236b1 of the bottom plate 2326b of the optical box 236, the flow thereof is blocked by the extended box portion 236c and the second optical box rib 236d. By this, even in the case where the air flow rates of the fans 112a and 112b increase, an effect similar to the above-described effect can be obtained.

Second Modified Embodiment

Figure 17:
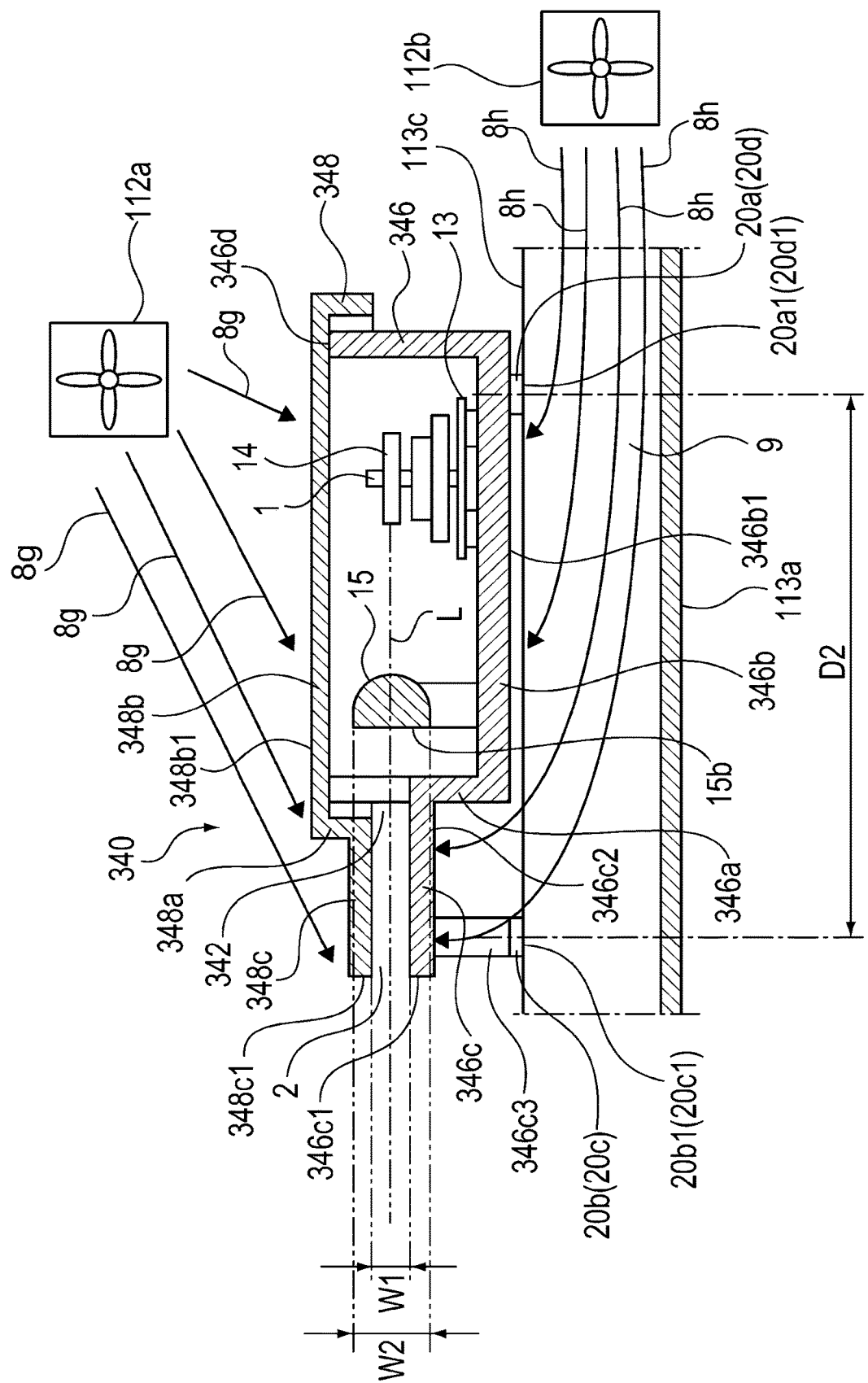
FIG. 17 is a sectional view showing the optical scanning apparatus in a second modified embodiment of the third embodiment and a flow of the air by the fan.

An optical scanning apparatus in a second modified embodiment of this embodiment and a flow of the air 8 by the fans 112a and 112b will be described using FIG. 17. FIG. 17 is a sectional view showing the optical scanning apparatus in the second modified embodiment of this embodiment and the flow of the air 8 by the fans 112a and 112b. Incidentally, members (portions) constituted similarly as in the above-described embodiments are represented by the same reference numerals or symbols and will be omitted from description.

As shown in FIG. 17, in an optical scanning apparatus 340 in this modified embodiment, a vertically extending portion 348a extending from a top surface 348b1 of a top plate 348b of a cover 348 downward perpendicular in a direction of approaching the laser light L is provided. The vertically extending portion 348a is provided on a side downstream, with respect to the emitting direction of the laser light L, of the optical surface 15a of the toric lens 15 which is provided in the optical scanning apparatus 340 and through which the emitted laser light L passes. Further, an extended portion 348c extending from the vertically extending portion 348a toward a downstream side of the emitting direction of the laser light L is provided.

On the other hand, on a laser light L emission side of the optical surface 15b of the toric lens 15, a standing portion 346a extending from a bottom plate 346b of an optical box 346 upward perpendicularly in a direction of approaching the laser light L is provided. Further, an extended box portion 346c extending from the standing portion 346a toward the downstream side of the emitting direction of the laser light L is provided. That is, the extended portion 348c is lowered by one step toward the laser light L from the top surface 348b1 of the cover 348 with the emitting port 342 as a boundary, and the extended box portion 346c is raised by one step toward the laser light L from the lower surface 346b1 of the bottom plate 346b of the optical box 346 with the emitting port 342 as a boundary. The optical box 346 is provided with an upper opening 346d, and the upper opening 346d is closed (covered) by the cover 348.

By the extended portion 348c and the extended box portion 346c, a space region 2 through which the laser light L passes is formed. A width W1 of this space region 2 with respect to a sub-scan direction is smaller than a width W2 of the optical surface 15b of the toric lens 15 with respect to the sub-scan direction. By this, the space region 2 through which the laser light L passes is ensured, and in addition, the width W1 of the emitting port 342 with respect to the sub-scan direction can be made small, and therefore, the air 8 which will flow from the outside toward the inside of the optical scanning apparatus 340 through the emitting port 342 can be further suppressed.

On a side opposite from the emitting port 342 with respect to the emitting direction of the laser light L, at a portion outside and above the cover 348, the first fan 112a is provided. On the other hand, on a side opposite from the emitting port 332 with respect to the emitting direction of the laser light L, at a portion outside and below the bottom plate 346b of the optical box 346 and at a position where the air 8h blows into the air passage 9 formed by the lower surface 346b1 of the bottom plate 346b of the optical box 346 and the duct portion 113b of the optical table 113, the second fan 112b is provided.

A free end portion 348c1 of the extended portion 348c and a free end portion 346c1 of the extended box portion 346c are in positions sufficiently remote from the optical surface 15b of the toric lens 15 on the downstream side of the emitting direction of the laser light L. For that reason, as regards the air 8g flowing from the first fan 112a toward the cover 348, the flow thereof toward the emitting port 342 is blocked by the extended portion 348c. Further, as regards the air 8h flowing from the second fan 112b toward the lower surface 346b1 of the bottom plate 346b of the optical box 346, in the air passage 9, the flow thereof toward the emitting port 342 is blocked by the extended box portion 346c. By this, an effect similar to the above-described effect can be obtained.

According to this modified embodiment, the width W1 of the space region 2 between the extended portion 348c and the extended box portion 346c is narrowed. For this reason, an amount of the dust carried by the air flowing toward the toric lens 15 provided inside the optical scanning apparatus 340, through the emitting port 342 can be further reduced, so that an amount of the dust carried by the air toward a further rear side of the toric lens 15 in the inside of the optical scanning apparatus 340 can be further reduced. By this, even in the case where the air flow amounts of the fans 112a and 112b increase with an increased print speed of the image forming apparatus 110, an effect similar to the above-described effect can be obtained.

On a lower surface 346c1 in the neighborhood of the free end portion 346c1 of the extended box portion 346c, the bases 20b and 20c provided with the mounting reference surfaces 20b1 and 20c1 through a pair of leg portions 346c3 are provided. Further, on a lower surface 346c1 of the bottom plate 346b of the optical box 346 and on a side opposite from the extended box portion 346c, the bases 20a and 20d provided with the mounting reference surfaces 20a1 and 20d1 are provided. Other constitutions are similar to those in the above-described embodiments, and an effect similar to the above-described effect can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-147179 filed on Aug. 9, 2019, which is hereby incorporated by reference herein in its entirety.

What is claimed is:

1. An image forming apparatus for forming an image on a recording material, comprising:
   a photosensitive member;
   an optical scanning unit configured to scan said photosensitive member with a light beam in accordance with image information, wherein said optical scanning unit includes a light source configured to emit the light beam in accordance with the image information, a rotatable polygonal mirror configured to deflect the light beam emitted from said light source, an optical box supporting said rotatable polygonal mirror, and a cover covering an opening of said optical box; and
   a fan configured to cool an inside of said image forming apparatus,
   wherein said fan is provided so that air from said fan directly impinges on said cover of said optical scanning unit,
   wherein as seen in a direction perpendicular to a rotational axis of said rotatable polygonal mirror, a rib extending from a top plate of said cover toward an optical box side is provided at a portion of said cover in a neighborhood of a light beam emitting port of said optical scanning unit,
   wherein said cover is provided with an extended portion extended from said rib in a light beam emitting direction, and
   wherein said fan is provided on a side upstream of said emitting port with respect to the light beam emitting direction, and a direction of the air impinging on said cover by said fan is a direction from an upstream side toward a downstream side with respect to the light beam emitting direction.

2. An image forming apparatus according to claim 1, further comprising a main assembly frame including a window through which the light beam emitted from said optical scanning unit passes,
   wherein the air impinging on said cover passes through said window via said extended portion.

3. An image forming apparatus according to claim 2, wherein said extended portion is inclined relative to a top surface of said cover.

4. An image forming apparatus according to claim 1, wherein a length of said extended portion from said rib with respect to the light beam emitting direction is 5-20 mm.

5. An image forming apparatus according to claim 1, wherein a second rib extending from said top plate of said cover toward the optical box side is provided at a portion of said cover, and wherein said second rib is provided at a position farther from the light beam emitting port than said rib provided at the portion of said cover in the neighborhood of the light beam emitting port with respect to the light beam emitting direction.

6. An image forming apparatus according to claim 1, wherein as seen in the direction perpendicular to the rotational axis of said rotatable polygonal mirror, a rib extending from a plate supporting said rotatable polygonal mirror of said optical box toward a cover side is provided at a portion of said optical box in a neighborhood of the light beam emitting port of said optical scanning unit, and
   wherein said optical box is provided with an extended portion extended from said rib of said optical box in a light beam emitting direction.

7. An image forming apparatus according to claim 1, further comprising a second fan provided on a side upstream of said emitting port with respect to the light beam emitting direction, and a direction of the air impinging on said optical box by said second fan is a direction from an upstream side toward a downstream side with respect to the light beam emitting direction.

8. An image forming apparatus according to claim 6, wherein a length of said extended portion of said optical box from said rib of said optical box with respect to the light beam emitting direction is 5-20 mm.

9. An image forming apparatus according to claim 6, wherein a second rib extending from said plate of said optical box toward a cover side is provided at a portion of said optical box, and wherein said second rib of said optical box is provided at a position farther from the light beam emitting port than said rib provided at the portion of said optical box in the neighborhood of the light beam emitting port with respect to the light beam emitting direction.

10. An image forming apparatus according to claim 9, wherein the second rib of said cover and the second rib of said optical box are provided at the same position with respect to the light beam emitting direction.

11. An image forming apparatus according to claim 6, wherein as seen in the direction perpendicular to the rotational axis of said rotatable polygonal mirror, a gap between the extended portion of said cover and the extended portion of said optical box is narrower than a gap between the top plate of said cover and the plate of said optical box at a position of said rotational polygonal mirror with respect to the light beam emitting direction.

12. An image forming apparatus for forming an image on a recording material, comprising:
   a photosensitive member;
   an optical scanning unit configured to scan said photosensitive member with a light beam in accordance with image information, wherein said optical scanning unit includes a light source configured to emit the light beam in accordance with the image information, a rotatable polygonal mirror configured to deflect the light beam emitted from said light source, an optical box supporting said rotatable polygonal mirror, and a cover covering an opening of said optical box; and
   a fan configured to cool an inside of said image forming apparatus,
   wherein said fan is provided so that air from said fan directly impinges on said optical box of said optical scanning unit,
   wherein as seen in a direction perpendicular to a rotational axis of said rotatable polygonal mirror, a rib extending from a plate supporting said rotatable polygonal mirror of said optical box toward a cover side is provided at a portion of said optical box in a neighborhood of a light beam emitting port of said optical scanning unit,
   wherein said optical box is provided with an extended portion extended from said rib in a light beam emitting direction, and
   wherein said fan is provided on a side upstream of said emitting port with respect to the light beam emitting direction, and a direction of the air impinging on said optical box by said fan is a direction from an upstream side toward a downstream side with respect to the light beam emitting direction.

13. An image forming apparatus according to claim 12, further comprising a main assembly frame including a window through which the light beam emitted from said optical scanning unit passes, wherein the air impinging on said optical box passes through said window via said extended portion.

14. An image forming apparatus according to claim 12, wherein said extended portion is inclined relative to a surface of the plate of said optical box.

15. An image forming apparatus according to claim 12, wherein a length of said extended portion from said rib with respect to the light beam emitting direction is 5-20 mm.

16. An image forming apparatus according to claim 12, wherein a second rib extending from said plate of said optical box toward the cover side is provided at a portion of said optical box, and wherein said second rib is provided at a position farther from the light beam emitting port than said rib provided at the portion of said optical box in the neighborhood of the light beam emitting port with respect to the light beam emitting direction.

\* \* \* \* \*